US012634524B2

(12) United States Patent
Denoual et al.

(10) Patent No.: US 12,634,524 B2
(45) Date of Patent: May 19, 2026

(54) METHOD, DEVICE, AND COMPUTER PROGRAM FOR ENHANCING ENCODING AND ENCAPSULATION OF POINT CLOUD DATA

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Val D'Anast (FR); Hervé Ruellan, Rennes (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/720,401

(22) PCT Filed: Dec. 15, 2022

(86) PCT No.: PCT/EP2022/086218
§ 371 (c)(1),
(2) Date: Jun. 14, 2024

(87) PCT Pub. No.: WO2023/111214
PCT Pub. Date: Jun. 22, 2023

(65) Prior Publication Data
US 2025/0056049 A1 Feb. 13, 2025

(30) Foreign Application Priority Data

| Dec. 16, 2021 | (GB) | ..................................... | 2118338 |
| Apr. 5, 2022 | (GB) | ..................................... | 2205011 |
| Apr. 19, 2022 | (GB) | ..................................... | 2205705 |

(51) Int. Cl.
| *H04N 19/70* | (2014.01) |
| *H04N 19/172* | (2014.01) |
| *H04N 19/597* | (2014.01) |

(52) U.S. Cl.
CPC ........... *H04N 19/70* (2014.11); *H04N 19/172* (2014.11); *H04N 19/597* (2014.11)

(58) Field of Classification Search
CPC ..... H04N 19/70; H04N 19/172; H04N 19/597
See application file for complete search history.

(56) References Cited

U.S. PATENT DOCUMENTS

| 2011/0064129 A1* | 3/2011 | Bennett | .................. | H04N 19/46 375/E7.076 |
| 2014/0176591 A1* | 6/2014 | Klein | ....................... | G09G 5/00 345/589 |

(Continued)

OTHER PUBLICATIONS

Chen et al.; Signalling VPCC sub-frame information; Mar. 2019 (Year: 2019).*

(Continued)

*Primary Examiner* — Jonathan R Messmore

(74) *Attorney, Agent, or Firm* — Canon U.S.A., Inc. IP Division

(57) ABSTRACT

A method for encapsulating point cloud data in a file compliant with the ISOBMFF standard. After having obtained point cloud data comprising 3D points, the obtained point cloud data being organized in at least one point cloud frame, at least two sub-frames of the at least one point cloud frame are determined, a timing information being associated with each of the at least two sub-frames, the timing information associated with one of the at least two sub-frames being different from the timing information associated with the other of the at least two sub-frames. Next, metadata describing the at least two sub-frames are generated, the generated metadata comprising or describing the timing information associated with each of the at least two sub-frames, and the obtained 3D points and the generated metadata are encapsulated in the file, each point cloud frame being encapsulated as one or more samples.

18 Claims, 9 Drawing Sheets

(56) References Cited

U.S. PATENT DOCUMENTS

| | | | |
|---|---|---|---|
| 2021/0005006 A1 | 1/2021 | Oh | |
| 2021/0195457 A1* | 6/2021 | Kim | H04L 5/0023 |
| 2021/0235058 A1* | 7/2021 | Yip | H04N 13/194 |
| 2025/0159123 A1* | 5/2025 | Takahashi | H04N 21/8547 |

OTHER PUBLICATIONS

Lulin Chen, et al., [V-PCC] Signalling VPCC sub-frame information, International Organisation for Standardisation ISO/IEC JTC1/SC29/WG11 Coding of Moving Pictures and Audio, Mar. 2019, Geneva, CH, Doc. No. m47296, XP30211227.

Franck Denoual, et al., [G-PCC SYS] Update for G-PCC sub-frame encapsulation, International Organisation for Standardisation ISO/IEC JTC1/SC29/WG 3 Coding of Moving Pictures and Audio, Oct. 2022, Mainz, DE, Doc. No. m61169, XP30305709.

Emre B. Aksu, Technologies Under Consideration for Carriage of Point Cloud Data, International Organisation for Standardisation ISO/IEC JTC1/SC29/WG11 Coding of Moving Pictures and Audio, Mar. 2019, Geneva, CH, Doc. No. N18414, XP30208682.

* cited by examiner

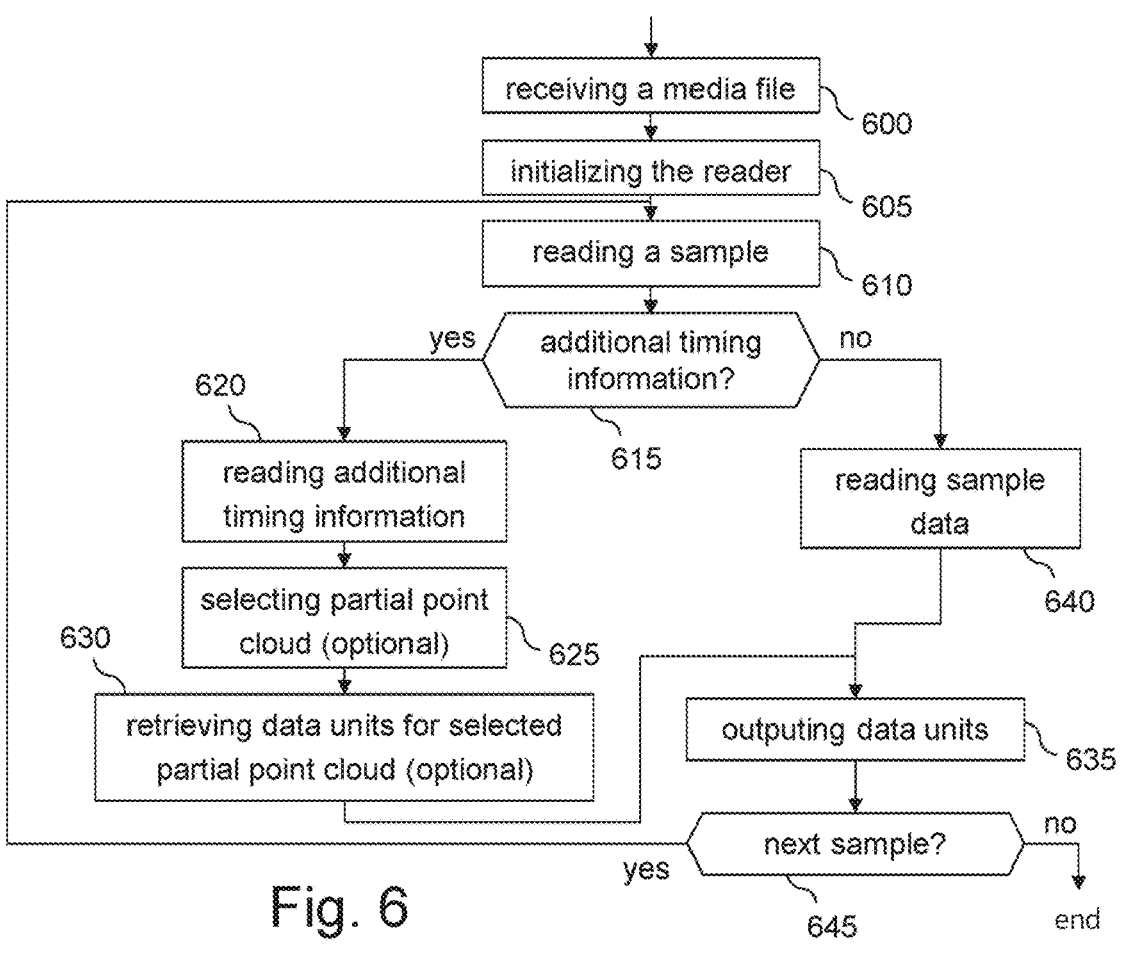

receiving a media file ⟋ 600 initializing the reader ⟋ 605 reading a sample ⟋ 610 additional timing information? — 615 yes — 620 reading additional timing information selecting partial point cloud (optional) — 625

630 — retrieving data units for selected partial point cloud (optional)

no reading sample data — 640 outputing data units — 635 next sample? — 645 yes    no    end

Fig. 6

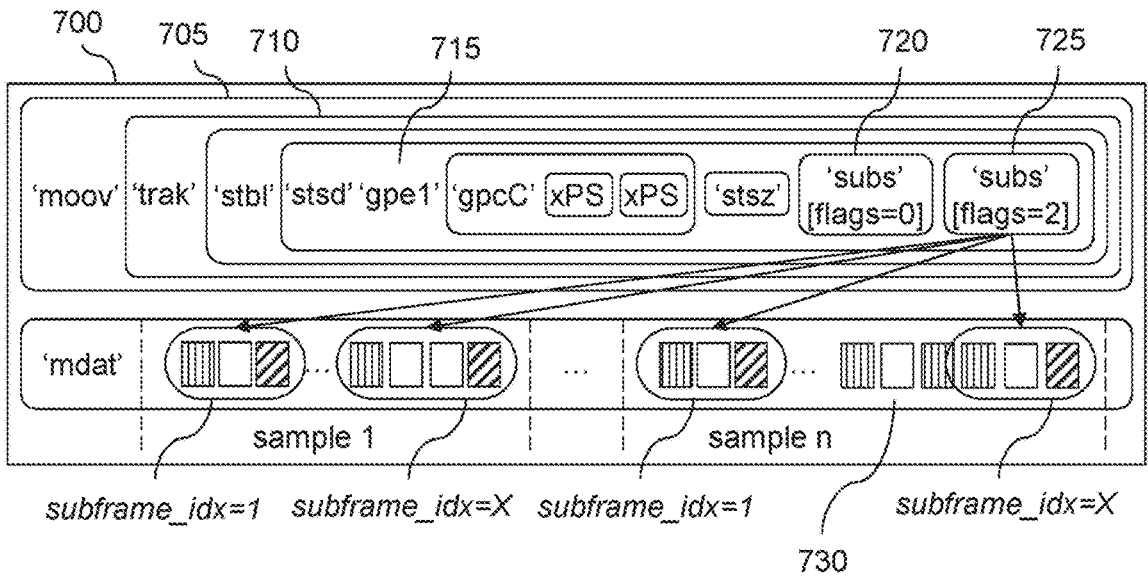

700  705  710  715    720  725

'moov' 'trak' 'stbl' 'stsd' 'gpe1' 'gpcC' xPS xPS 'stsz' 'subs' [flags=0] 'subs' [flags=2]

'mdat'    sample 1    ...    sample n subframe_idx=1    subframe_idx=X    subframe_idx=1    subframe_idx=X

730 subframe_idx=reserved_value (not mapped)

geometry data unit attribute data unit frame index attribute data unit

Fig. 7

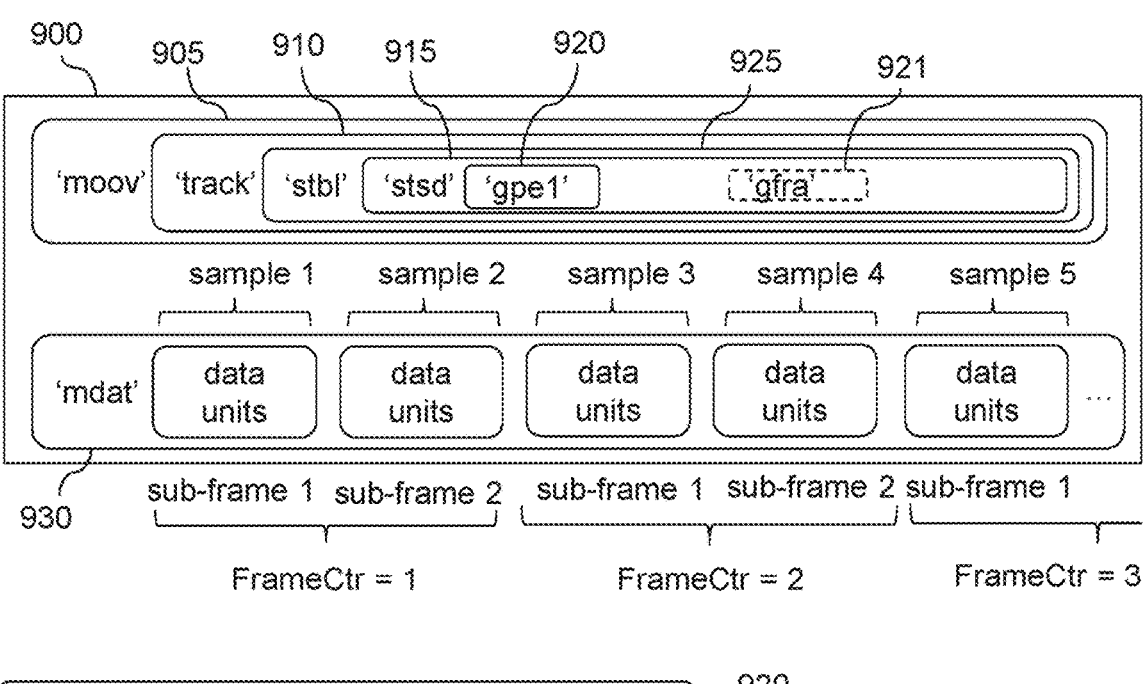
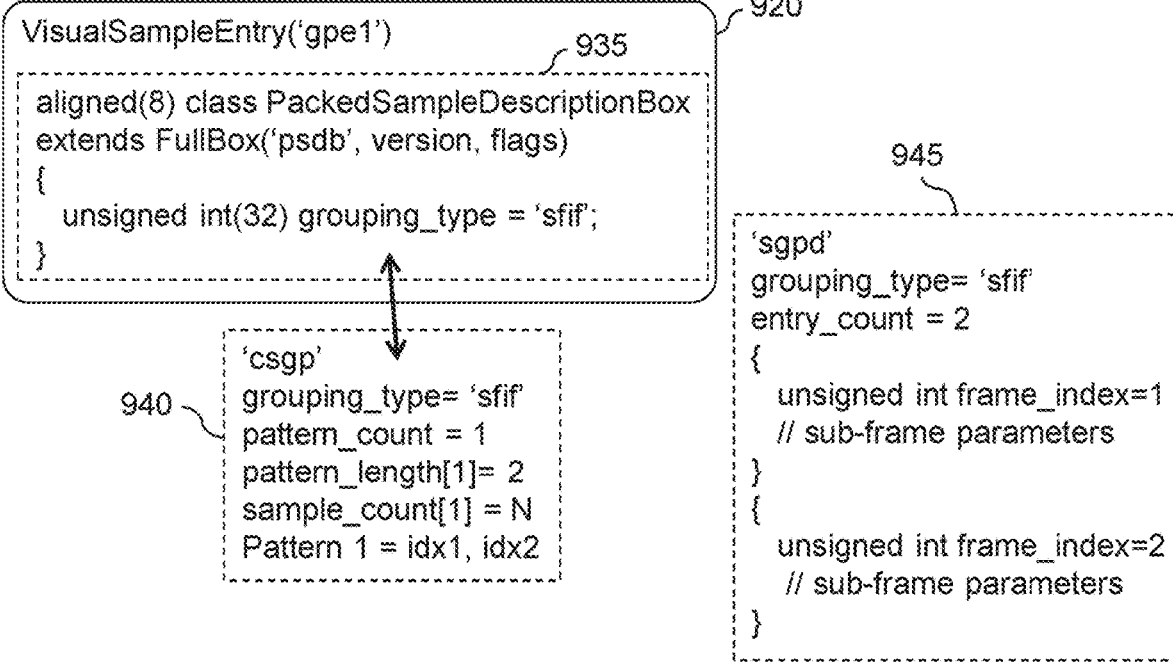
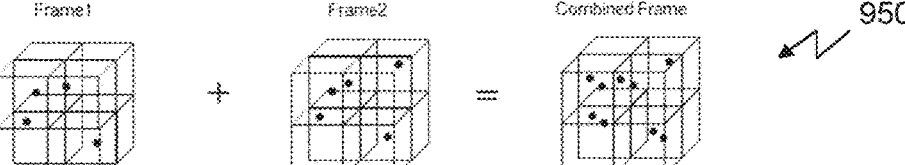
Fig. 9 retrieving point cloud data     1200 determining geometry characteristics     1205 determining attribute characteristics     1210 compressing geometry and attribute data     1215 generating additional attribute description information     1220 encoding the compressed data     1225

METHOD, DEVICE, AND COMPUTER PROGRAM FOR ENHANCING ENCODING AND ENCAPSULATION OF POINT CLOUD DATA

CROSS REFERENCE TO RELATED APPLICATION

This application is the National Phase application of PCT Application No. PCT/EP2022/086218, filed on Dec. 15, 2022. This application claims the benefit under 35 U.S.C. § 119 (a)-(d) of United Kingdom Patent Application No. 2118338.9, filed on Dec. 16, 2021 and entitled "METHOD, DEVICE, AND COMPUTER PROGRAM FOR OPTIMIZING ENCAPSULATION OF POINT CLOUD DATA", and of United Kingdom Patent Application No. 2205011.6, filed on Apr. 5, 2022 and entitled "METHOD, DEVICE, AND COMPUTER PROGRAM FOR ENHANCING ENCODING AND ENCAPSULATION OF POINT CLOUD DATA", and of United Kingdom Patent Application No. 2205705.3, filed on Apr. 19, 2022 and entitled METHOD, DEVICE, AND COMPUTER PROGRAM FOR OPTIMIZING ENCAPSULATION OF POINT CLOUD DATA. The above cited patent applications are incorporated herein by reference in their entirety.

FIELD OF THE DISCLOSURE

The present disclosure relates to encoding and encapsulation of data, in particular of point cloud data, in a standard and interoperable format, for example to store or transmit efficiently point cloud frames comprising 3D points.

BACKGROUND OF THE DISCLOSURE

The Moving Picture Experts Group (MPEG) is standardizing the compression and storage of point cloud data (also called volumetric media data) information. Point cloud information consists in sets of 3D points with associated attribute information such as colour, reflectance, and frame index.

On the first hand, MPEG-I Part-9 (ISO/IEC 23090-9) specifies Geometry-based Point Cloud Compression (G-PCC) and specifies a bit-stream syntax for point cloud information. According to MPEG-I Part-9, a point cloud is an unordered list of points comprising geometry information, optional attributes, and associated metadata. Geometry information describes the location of the points in a three-dimensional Cartesian coordinate system. Attributes are typed properties of each point, such as colour or reflectance. Metadata are items of information used to interpret the geometry information and the attributes. The G-PCC compression specification (MPEG-I Part-9) defines specific attributes like frame index attribute or frame number attribute, with a reserved attribute label value (3 to indicate a frame index and 4 to indicate a frame number attribute), being recalled that according to MPEG-I Part-9, a point cloud frame is set of points at a particular time instance. A point cloud frame may be partitioned into one or more ordered sub-frames. A sub-frame is a partial representation of a point cloud frame consisting of points with the same frame number or frame index attribute value. For example, a sub-frame may be a set of points with their attributes within a point cloud frame that share common acquisition, capture, or rendering time. As another example, a sub-frame may be a set of points with their attributes within a point cloud frame that were successively acquired or capture during a given time range or should be rendered in a given time range. Yet as another example, a sub-frame may be a set of points with their attributes within a point cloud frame that were acquired according to a laser shot direction or corresponding to a part of the scanning path of the 3D sensor. Still in MPEG-I Part-9, a point cloud frame is indicated by a FrameCtr variable, possibly using a frame boundary marker data unit or parameters in some data unit header (a frame_ctr_lsb syntax element).

On the second hand, MPEG-I Part-18 (ISO/IEC 23090-18) specifies a media format that makes it possible to store and to deliver geometry-based point cloud compression data. It is also supporting flexible extraction of geometry-based point cloud compression data at delivery and/or decoding time. According to MPEG-I Part-18, the point cloud frames are encapsulated in one or more G-PCC tracks, a sample in a G-PCC track corresponding to a single point cloud frame. Each sample comprises one or more G-PCC units which belong to the same presentation or composition time. A G-PCC unit is one type-length-value (TLV) encapsulation structure containing one of SPS, GPS, APS, tile inventory, frame boundary marker, geometry data unit, and attribute data units. The syntax of TLV encapsulation structure is defined in Annex B of ISO/IEC 23090-9.

While the ISOBMFF file format has proven to be efficient to encapsulate point cloud data, there is a need to improve encoding and encapsulation efficiency in particular to improve description of encoded and encapsulated data in order to optimize the access to particular items of data.

SUMMARY OF THE DISCLOSURE

The present disclosure has been devised to address one or more of the foregoing concerns.

In this context, there is provided a solution for improving encapsulation of point cloud data.

According to a first aspect of the disclosure there is provided a method for encapsulating point cloud data in a file compliant with an ISOBMFF based standard, the method comprising:

- obtaining point cloud data comprising 3D points, the obtained point cloud data being organized in at least one point cloud frame;
- determining at least two sub-frames of the at least one point cloud frame, a timing information being associated with each of the at least two sub-frames, the timing information associated with one of the at least two sub-frames being different from the timing information associated with the other of the at least two sub-frames;
- generating metadata describing the at least two sub-frames, the generated metadata comprising or describing the timing information associated with each of the at least two sub-frames; and
- encapsulating the obtained 3D points and the generated metadata in the file, each point cloud frame being encapsulated as one or more samples.

Accordingly, the method of the disclosure makes it possible to describe sub-frames in a file containing encapsulated point cloud data, making it possible, in particular, to identify or access and to extract specific point cloud data, without decoding data units that are not requested, enabling for example partial rendering.

According to some embodiments, the timing information associated with at least one of the at least two sub-frames is determined as a function of acquisition timing information associated with 3D points of the at least one of the at least two sub-frames or as a function of rendering timing information associated with 3D points of the at least one of the at least two sub-frames.

Still according to some embodiments, the timing information associated with at least one of the at least two sub-frames is defined or described as a time interval or as a timestamp.

Still according to some embodiments, the timing information associated with at least one of the at least two sub-frames is a frame index.

Still according to some embodiments, the generated metadata further comprise a description of the at least one point cloud frame, the description of the at least one point cloud frame comprising a frame rate enabling determining timing of sub-frames when combined with the frame index.

Still according to some embodiments, the timing information is relative to a frame or is relative to a track.

Still according to some embodiments, common timing information associated with the at least two sub-frames is provided within a sub-frame configuration structure of the metadata.

Still according to some embodiments, the timing information associated with at least one of the at least two sub-frames is provided within a sub-sample description.

Still according to some embodiments, the timing information associated with at least one of the at least two sub-frames is provided within a sample group description.

Still according to some embodiments, the at least two sub-frames are described in different tracks.

Still according to some embodiments, the number of sub-frames per frame varies from one frame to another.

Still according to some embodiments, the number of 3D points within one of the at least two sub-frames is different from the number of 3D points within the other of the at least two sub-frames.

According to a second aspect of the disclosure there is provided a method for parsing point cloud data encapsulated in a file compliant with an ISOBMFF based standard, the point cloud data comprising 3D points and being organized in at least one point cloud frame, each point cloud frame being encapsulated as one or more samples, the method comprising:

obtaining metadata from the file, identifying, from the obtained metadata, timing information associated with each of at least two sub-frames of the at least one point cloud frame, the timing information associated with one of the at least two sub-frames being different from the timing information associated with the other of the at least two sub-frames, and obtaining 3D points of at least one of the at least two sub-frames, the 3D points being obtained as a function of the timing information associated with the at least one of the at least two sub-frames.

Accordingly, the method of the disclosure makes it possible to obtain a description of sub-frames in a file containing encapsulated point cloud data, making it possible, in particular, to access and to extract specific point cloud data, without decoding data units that are not requested, enabling for example partial rendering.

According to some embodiments, the timing information associated with at least one of the at least two sub-frames is representative of acquisition timing information associated with 3D points of the at least one of the at least two sub-frames or representative of rendering timing information associated with 3D points of the at least one of the at least two sub-frames.

Still according to some embodiments, the timing information associated with at least one of the at least two sub-frames is defined or described as a time interval, as a timestamp, or as a frame index.

Still according to some embodiments, the at least two sub-frames are described in different tracks, wherein the number of sub-frames per frame varies from one frame to another, and/or wherein the number of 3D points within one of the at least two sub-frames is different from the number of 3D points within the other of the at least two sub-frames.

Still according to some embodiments, the timing information associated with each of the at least two sub-frames is provided within a sub-frame configuration structure, a sub-sample description, or within a sample group description.

According to another aspect of the disclosure there is provided a device comprising a processing unit configured for carrying out each of the steps of the method described above.

This aspect of the disclosure has advantages similar to those mentioned above.

At least parts of the methods according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the solution of the present disclosure can be implemented in software, the solution of the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Some embodiments of the disclosure will now be described, by way of example only, and with reference to the following drawings in which:

FIGS. 4a, 4b, and 4c illustrate an example of different G-PCC frame and sub-frame configurations;

FIGS. 5a to 5e illustrate different track organizations for the encapsulation of PCC frames and sub-frames into a media file;

FIG. 6 illustrates an example of steps of a parsing process according to some embodiments of the invention, making it possible to identify metadata structures providing ATI in G-PCC tracks and to extract a subset of data corresponding to a G-PCC sub-frame or a set of G-PCC sub-frames;

FIG. 7 illustrates encapsulation of additional timing information (ATI) in a sub-sample information box ('subs' box) of a G-PCC track;

FIG. 9 illustrates a media file having a single G-PCC track described in a 'trak' box of a 'moov', containing a sub-frame description through packing of samples;

DETAILED DESCRIPTION OF THE DISCLOSURE

According to some embodiments of the disclosure, additional metadata are provided in G-PCC tracks to provide description of sub-frames (i.e. parts of a PCC sample with a same acquisition or capture time or a same rendering or presentation or composition time). This improves time granularity and enables, depending on the 3D sensor that is used, providing spatial access (e.g. the direction of a laser shot) within a PCC sample.

These additional metadata may comprise additional timing information (ATI) such as acquisition time or rendering time information in the description of PCC tracks. It is an additional timing information to classical sample timing information like decoding time or composition time contained in the sample description boxes. This ATI may be associated with subsamples to provide PCC sub-frames (e.g. from MPEG-I Part-9) description in G-PCC tracks. ATI may also be called "sub-frame descriptor", "sub-frame description", or "sub-frame description structure". Such additional information allows identifying or accessing or extracting data units corresponding to a sub-frame, i.e. data units within a sample corresponding to a given acquisition or rendering time (or consecutive range of acquisition or rendering time) or to a given shot direction of the sensor producing the point cloud.

In other words, timestamp information provided by 3D sensors (e.g. radar based on laser beam scanning, spinning LIDARs, MEMS (Micro Electro Mechanical Systems) LIDARs, etc.) able to generate a point cloud with timestamp information associated with the recorded points may be used during the encapsulation process, in particular to encapsulate sub-frames.

Figure 1:
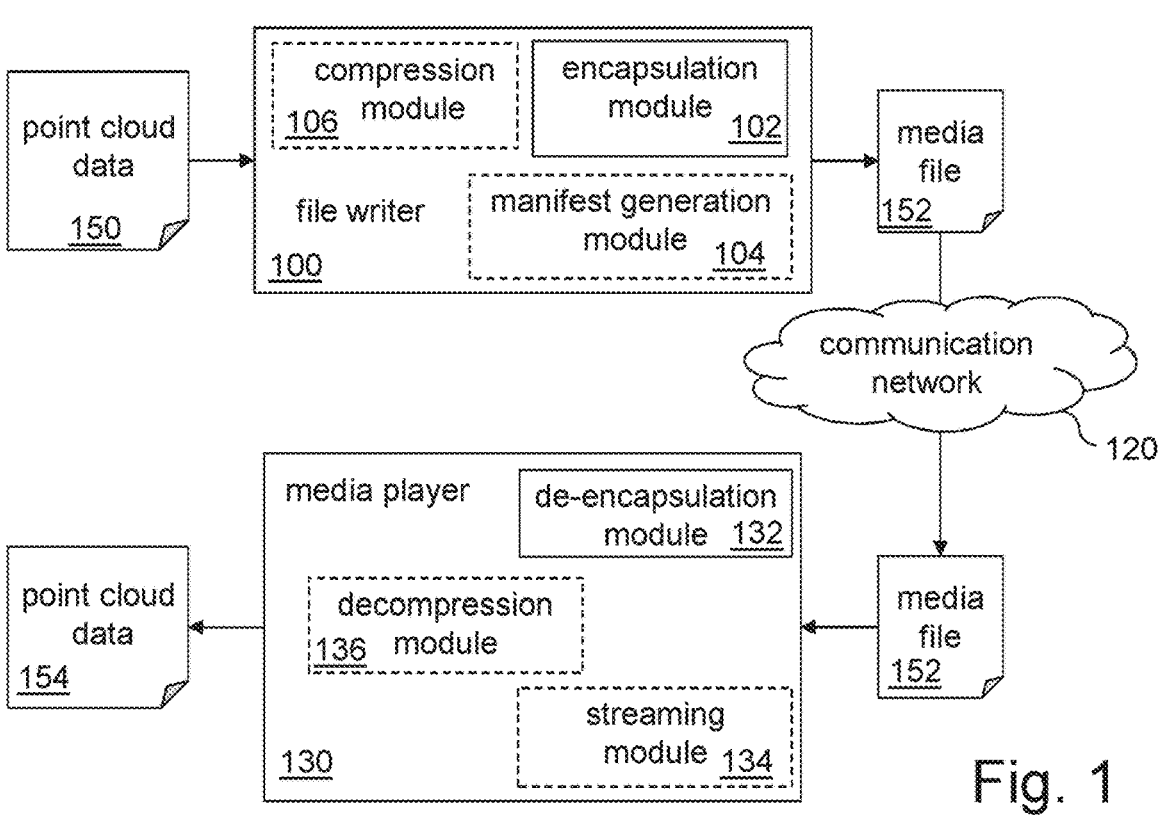
FIG. 1 illustrates an example of a system wherein the invention can be implemented.

FIG. 1 illustrates an example of a system wherein the invention can be implemented. More precisely, the invention may be used in a media file writer such as media file writer 100 or in a media player such as media player 130 or in both.

As illustrated, media file writer 100 takes point cloud data (or volumetric data), such as point cloud data 150, as input. Point cloud data 150 may be obtained from a 3D sensor, as described by reference to FIG. 2. The point cloud data may be received as uncompressed raw data or as a compressed bit-stream, for example a compressed bit-stream complying with the MPEG-I Part-9 standard. Media file writer 100 comprises encapsulation module 102.

Media file writer 100 may be connected, via a network interface (not represented), to a communication network 120 to which may also be connected, via a network interface (not represented), media player (or reader) 130 comprising a de-encapsulation module 132.

Media file writer 100 may be used to serve media files, for example using a protocol for dynamic adaptive streaming on HTTP like DASH (Dynamic Adaptive Streaming over HTTP) or HTTP Live Streaming. These protocols require a streaming manifest, such as a Media Presentation Description (MPD), or a playlist. When used to stream encapsulated media content, media file writer 100 may contain a manifest generation module such as manifest generation module 104. Media file writer 100 may also contain a compression module such as compression module 106 to compress the input point cloud data into a compressed bit-stream, for example using a point cloud compression algorithm like the one described in MPEG-I Part-9.

Encapsulation module 102 may encapsulate received point cloud data according to an ISOBMFF-based format like MPEG-I Part-18, for interoperability purposes, in order to generate a media file like media file 152 that may be stored for later use by a player or by an image analysis tool or that may be transmitted to a media player or streaming client. The encapsulation process carried out in encapsulation module 102 is further described in reference to FIG. 3.

Media file writer 100 may be controlled and parameterized by a user, for example through a graphical user interface or by an application, for example by application code or scripting. To process compressed point cloud data, for example to process a bit-stream of compressed point cloud data complying with MPEG-I Part-9, encapsulation module 102 may contain a G-PCC unit parser that can read the header of G-PCC units, for example to determine the length (e.g. in bytes, like the tlv_num_payload_bytes syntax element) of the data corresponding to the unit or the unit type (e.g. the tlv_type syntax element). The G-PCC unit parser may also be able to parse header information for some G-PCC units, like for example the attribute header (to obtain its type) and may also be able to parse parameter sets to obtain general information on the bit-stream. To process uncompressed point cloud data, for example data obtained directly from a 3D sensor, encapsulation module 102 may contain a point cloud data parser that can read the point positions and their attributes directly from the captured raw data (e.g. a .ply or .pcd file parser). The media writer may be embedded in a recording device, in a multi-sensor camera device, on a vehicle embedding 3D sensors or be part of software tools in a studio where volumetric data is acquired.

Media file 152 may consist in a single media file or in a set of media segment files, for example as ISOBMFF segments (ISO base media file containing one or more segment(s)). The media file may be a fragmented file, for example for live acquisition or capture and encapsulation or live (or low-latency) streaming. It may comply with the ISOBMFF standard or to standard specifications derived from ISOBMFF (e.g. MPEG-I Part-18).

Media player (or reader) 130 may be a streaming client, the streaming features being handled by a streaming module like streaming module 134, for example implementing a DASH or HLS client, for requesting a media file such as media file 152 and for adapting the transmission parameters. Media player 130 may also contain a decompression module 136 taking as input a bit-stream representing compressed point cloud data, for example a bit-stream complying with MPEG-I Part-9, and generating point cloud data (or volumetric data) for rendering or analysis. Media file 152 may be read from a storage location or streamed using the streaming module 134. The data may be read at once or by chunks, segments, or fragments and provided to de-encapsulation module (or parsing module) 132.

De-encapsulation module (or parsing module) 132 then extracts the, or a subset of, encapsulated point cloud data, depending on the player configuration or on the choices from a user or on the parameters of an application using the media player. The extracted point cloud data may result in a bit-stream such as a bit-stream complying with MPEG-I Part-9. In such a case, the bit-stream is provided to a decompression module (an external decompression module or an internal decompression module, e.g. internal decompression module 136) for the reconstruction of the point cloud data 154 for usage by a user or application (for example visualization or analysis). The parsing process is further described in reference to FIG. 4. A media player may be embedded in a display device (e.g. a smartphone, tablet, PC, vehicle with multimedia screen, etc. or software tools in a studio for volumetric data production).

Acquiring Point Cloud Data

The inventors have observed that while point cloud data are often organized by frames, each frame being associated with particular time instance, the 3D points of a point cloud frame are generally acquired sequentially by the sensor that is used. Storing acquisition, capture, or rendering time information in relation with encapsulated point cloud data may be useful, for example to enable direct access to specific data within a frame.

Figure 2:
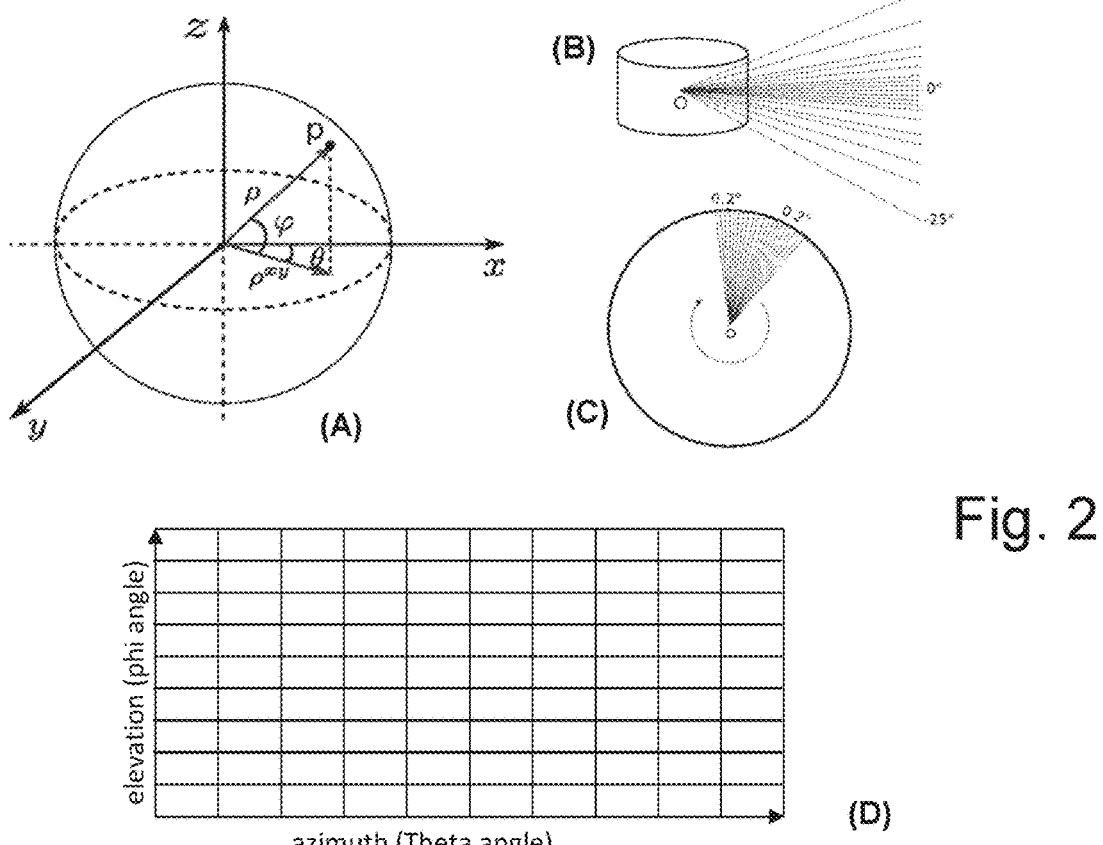
FIG. 2 illustrates the acquisition or capture of point cloud data using a 3D sensor of the LIDAR type.

FIG. 2 illustrates the acquisition or capture of point cloud data using a 3D sensor of the LIDAR (light detection and ranging) type. Some sensors, like rotating or spinning LIDARs may cover an entire sphere, as illustrated in FIG. 2 with reference 'A', by successively scanning the sphere from a point of origin. For example, a typical LIDAR sensor emits pulsed light waves into the surrounding environment by first scanning along elevation angle, as illustrated in FIG. 2 with reference 'B', and then along azimuth angle, as illustrated in FIG. 2 with reference 'C'. These emitted pulses (or laser shots) bounce off surrounding objects and return to the sensor. The sensor uses the time it took for each pulse to return to the sensor to calculate the distance it travelled.

Each laser shot for a given direction (i.e. a pair of angles (azimuth, elevation) or (phi, theta)) makes it possible to obtain a distance, the direction and the obtained distance defining a 3D point, possibly described by Cartesian coordinates as illustrated in FIG. 2 with reference 'A'. As illustrated in FIG. 2 with reference 'D', the measured distances may be stored in cells of an array wherein rows and columns represent elevation and azimuth, respectively, being noted that some cells may be empty. By repeating this process, the sensor can build a 3D map of the environment. The 3D map may cover a 360° field of view or less than 360, depending on the sensor characteristic (or configuration). The characteristics may describe the field of view, for example as theta or phi covered ranges, the angular resolution (or angle step) that indicates the difference between two shots in unit of azimuth or elevation angle.

The emitted laser shots hitting an object and returning to the sensor generates one (or possibly more than one) point on the resulting image. The acquisition may be done at a frame rate, that is another parameter of the 3D sensor, defining the acquisition time between two frames, a frame corresponding, for example, to the capture of the maximum field of view supported by the device (e.g. a complete 360° capture when the device allows covering a 360° field of view). As observed above, the points contained in a frame may be successively acquired. As a consequence, these points may have different acquisition time and/or may have different rendering time later on. The set of frames obtained from the 3D sensor results in a point cloud sequence. Each frame may be associated with a frame counter or frame time and points within the frame may also have additional timing information, corresponding for example to their capture time by the 3D sensor.

Naturally, there exist other types of 3D sensors wherein 3D data of the same frame are acquired successively.

It is observed that there exist applications that can take advantage of using such timing information. For example, there exist neural networks that may rely on such timing information to guide autonomous vehicles (autonomous guided vehicles, cars, drones, or robots) in real environment. For such applications, a precise measurement of the timing information associated with the cloud of points may be necessary for accurate estimation. There may also be applications for augmented reality where a 3D object is composed onto natural video, for telepresence or for topography measurement applications. Accordingly, 3D sensors may associate timestamp information with each detected point. Such timestamps may be stored as attributes, in addition to colour and reflectance. It is also to be noted that for compressed point cloud data, several frames may be packed or combined into one combined or aggregated frame to improve the compression efficiency, thus the frame in a Point Cloud bitstream may not correspond to a frame at the output of a 3D sensor, and may have different timing information (a timing resulting from encoding choice and a timing corresponding to a capture time).

Encapsulation Process, G-PCC Configuration, and Track Organization

Figure 3:
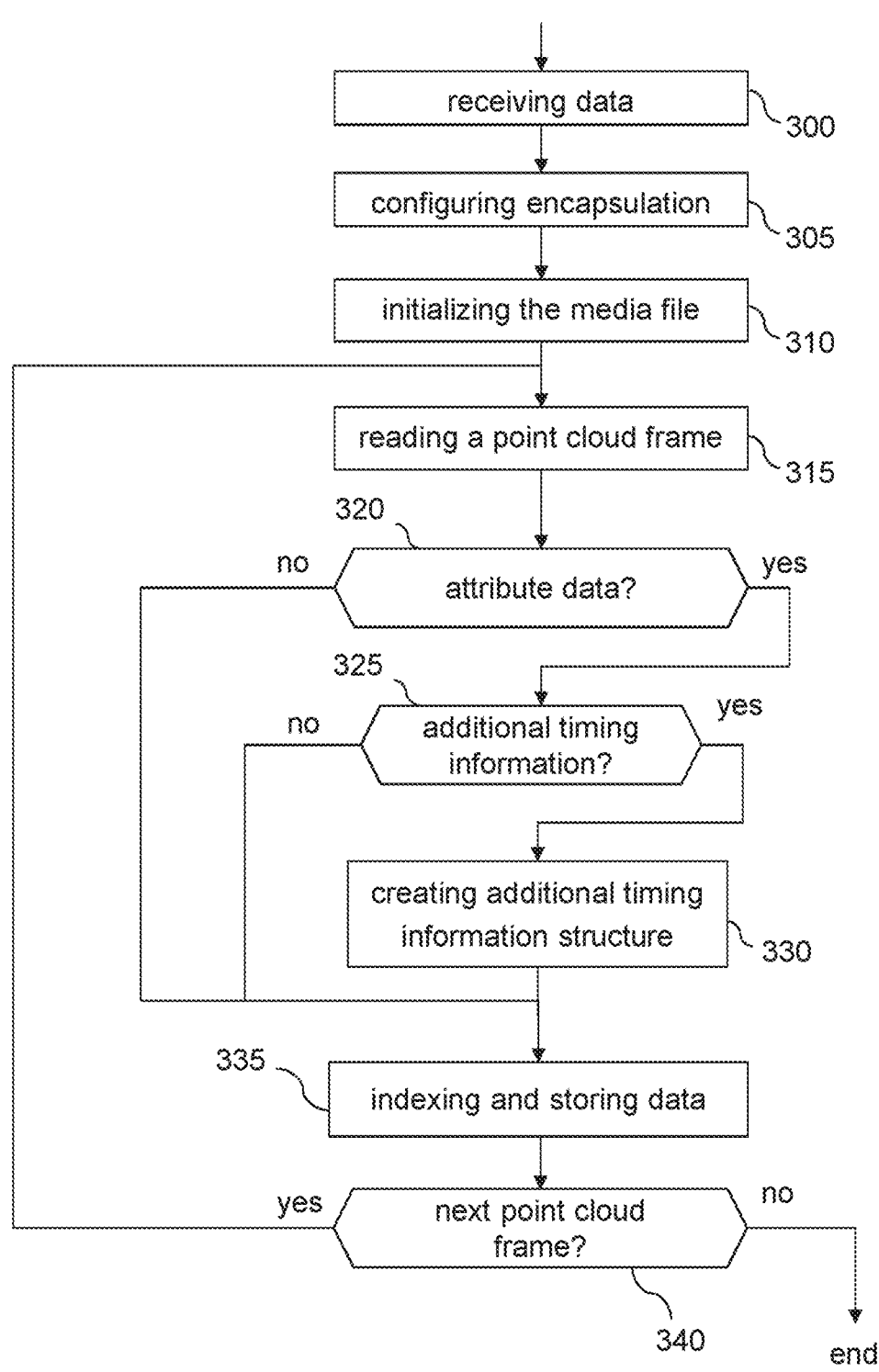
FIG. 3 illustrates an example of steps of an encapsulation process according to some embodiments of the invention.

FIG. 3 illustrates an example of steps of an encapsulation process according to some embodiments of the invention, making it possible to identify timing information in input data, for example in point cloud data 150 in FIG. 2, and in adding description of sub-frames in G-PCC tracks. For the sake of illustration, the steps illustrated in FIG. 3 may be carried out by encapsulation module 102 in FIG. 1.

According to the illustrated example, a first step (step 300) is directed to initializing the reception of the point cloud data (or volumetric data) to encapsulate. Next, the encapsulation module is configured (step 305) as a function of the type of data to be processed (e.g., depending on whether the point cloud data are compressed or not depending on whether the point cloud data are analyzed or not). This can be done by a user or by an application. For the sake of illustration, the configuration may comprise choosing a single track or multi-track encapsulation, choosing a live or offline encapsulation, choosing a description mode, for example describing tiles or not, determining the granularity of the timing, for example whether timing information should be associated with each point of the cloud, or sets of points on a capture time range etc. In the following, it is considered that timing information is associated with each point of the cloud or with set of points of the cloud forming sub-frames. It is to be noted that when combined or aggregated frames are encoded as a single frame, each frame that is part of the combination or aggregation may be considered as a sub-frame or as a G-PCC sub-frame when compressed with MPEG-I Part-9. Several points may share the same timing information or each point may have its own timing information. Timing information may be incremental from one point to another, following a scanning path of the 3D sensor. The timing increments may be fixed or variable depending on the 3D sensor.

Configuration step 305 may also be used to indicate whether the same configuration parameters should apply for encapsulating the whole point cloud data (static configuration) or may change when encapsulating the point cloud data (dynamic configuration). In case the media file writer also contains a compression module, for example compression module 107 in FIG. 1, the configuration step may comprise setting parameters for the encoder: for example setting the display frame rate, setting an acquisition frame rate, setting a maximum number of sub-frames allowed in a frame, setting the number of sub-frames per frame, setting whether the number of sub-frames per frame is fixed or not, setting whether the sampling rate or time difference between sub-frames is constant or variable or setting parameters of the 3D sensor like field of view, angular resolution, description of the scanning path, etc. The compression module may encode these configuration parameters, for example as additional syntax elements of a G-PCC bit-stream, for example in the Sequence Parameter Set, in a volumetric usage information unit with a dedicated TLV type, or as supplemental enhancement information message, also with a dedicated TLV type. When the point cloud data are received by the encapsulation module as a G-PCC bit-stream (e.g. a bit-stream generated by the compression module 106 in FIG. 1, or by an external compression module), the configuration of the encapsulation module may use information from the parameter sets of the bit-stream or supplemental information associated with the bit-stream (sometimes called SEI (Supplemental Enhancement Information) messages). Supplemental information means encoded parameters that are not mandatory to decode the point cloud data but that may help application using these point cloud data by providing additional information.

Further to the configuration of the encapsulation module, metadata structures of a media file such as top-level boxes (e.g., ftyp or styp, moov, trak, mdat and boxes for sample description like stbl, stsd, etc) are created during an initialization step (step 310). Such an initialisation step may comprise reading parameter sets (e.g. geometry and attribute parameter sets) from an encoded bit-stream of point cloud data or may comprise obtaining information about the sensor (for uncompressed data) like a number of points, the types of attributes associated with the points (e.g., color, reflectance, timestamp, areas of interests, etc.). It is noted that some of the setting parameters defined in configuration step 305 may be reflected in track description or sample description. As well, supplemental information when available may be entirely or partially included in the media file. Parts of the configuration information (configuration parameters, parameter sets, or supplemental information) may be gathered in a metadata structure dedicated to sub-frame configuration information (also called sub-frame configuration structure). For example, a metadata structure dedicated to sub-frame configuration information may contain an acquisition frame rate, a point sampling rate, a number of sub-frames within a frame, a number of frames combined in a combined or aggregated frame, and/or any other information for determining composition or rendering time of each sub-frame. Depending on static or dynamic configuration, a metadata structure dedicated to sub-frame configuration information may be included in different parts of a track description. For static configuration, it may be included as an additional optional box in a sample entry or within a GPCCConfigurationBox box, or as a dedicated box in the track description. For dynamic configuration, a metadata structure dedicated to sub-frame configuration information may be provided as entries in a SampleGroupDescriptionBox with a specific grouping type so that group of samples sharing the same configuration can be mapped to one of these entries. In a variant for the dynamic configuration, a metadata structure dedicated to sub-frame configuration information may be contained with the sub-frame description itself, for example as a SubFrameConfigurationGroupEntry inheriting from a VolumetricVisualSampleGroupEntry:

```
class SubFrameConfigurationGroupEntry ( ) extends
VolumetricVisualSampleGroupEntry ('sfcf') {
unsigned int (16) nb_subframes;
// optional parameters:
unsigned int (16) max_nb_subframes;
unsigned int (32) capture_timescale;
unsigned int (32) sampling_rate;
unsigned int (16) angular_resolution;
// any other parameters describing the 3D sensor or sub-frame
configurations
}
``` where nb_subframes provides the number of sub-frames for the samples mapped to this sample group entry. The capture_timescale may be an integer that specifies the number of time units that pass in one second. It may be present when the timescale from the 'mdhd' box is not suitable, for example does not have sufficient granularity. The max_nb_subframes parameter optionally indicates the maximum number of sub-frames allowed in a sample. It may be indicated for dynamic configuration when the number of sub-frames per sample may vary along a point cloud sequence. The sampling_rate parameter may be an integer providing an acquisition rate of the 3D sensor, expressed in capture_timescale units when present or from the timescale in the 'mdhd' box otherwise. It may be used to compute a presentation or composition time for the sub-frames.

For instance, in a sample, the timing or presentation time or composition time of a sub-frame, identified by a given frame index attribute value subframe_idx, may be computed as follows when the capture_timescale parameter is defined:

$$CT(\text{sub-frame}) = CT(\text{sample}) + \text{subframe\_idx} * \text{sampling\_rate}/\text{capture\_timescale}$$

where CT(sub-frame) is the presentation or composition time for the sub-frame, CT(sample) is the presentation or composition time for the sample containing the sub-frame, and subframe_idx is the index of the sub-frame in the sample.

Alternatively, when the capture_timescale parameter is not defined, the timing or presentation time or composition time of the sub-frame may be computed as follows:

$$CT(\text{sub-frame}) = CT(\text{sample}) + \text{subframe\_idx} * \text{sampling\_rate}/\text{timescale};$$

where CT(sub-frame) is the presentation or composition time for the sub-frame, CT(sample) is the presentation or composition time for the sample containing the sub-frame, subframe_idx is the index of the sub-frame in the sample, and timescale is the timescale from the 'mdhd' box.

It is to be noted as a variant for the static configuration, a default sample grouping, further indicated as a static sample group (by setting static_group_description and static_mapping flags values to 1) may also be used to describe sub-frame configuration information. When a metadata structure dedicated to sub-frame configuration information (also called sub-frame configuration structure) is included as an additional optional box, for example named SubFrame- ConfigurationBox identified by 'sfcg' four-character code, the fields of this box may be the same as in a subFrameconfigurationGroupEntry.

Next, the encapsulation process enters in a processing loop for processing each frame of the point cloud data.

After reading a point cloud frame (step 315), for example unit by unit from a bit-stream of compressed point cloud data or point by point from a sensor record (e.g. a .ply file or .pcd file), the encapsulation module determines whether the read data correspond to attribute data (test 320). Determining the type of the read data may consist in determining the type of a G-PCC unit by reading its type using a G-PCC unit parser (not represented). If it is determined that the read data correspond to attribute data, the type of attribute data is further checked by the G-PCC unit parser (test 325) to determine whether the attribute data comprise additional timing information. It is recalled that for a G-PCC bitstream, attribute data correspond to a TLV unit of ADU (Attribute Data Unit) type. Therefore, at step 325, the encapsulation module may check if the attribute data unit read in step 315 provides additional timing information for some points of the frame. For example, for a G-PCC bit-stream, such points of the frame may correspond to a G-PCC sub-frame (according to MPEG-I Part-9). Accordingly, it may come as a G-PCC attribute data unit of type frame index (attr_label equal to 3) or of type frame number (attr_label equal to 4). It may also come, in case of uncompressed received data, as a timestamp value associated with the point of the cloud, as determined from the sensor data (using a ply or .pcd file reader).

Alternatively, additional timing information for some points of the frame can be provided using supplemental information associated with the bit-stream (sometimes called SEI (Supplemental Enhancement Information) messages) or out-of-band, i.e., by external means not directly included within the G-PCC bit-stream.

If additional timing information is provided for some points of the frame, a new metadata structure for additional timing information (ATI) is created (step 330). The creation of this metadata structure may consist in collecting parameters describing the timing information associated with some points of the frame, for example within a sub-frame. The timing information for a frame is described as part of the sample description, for example in 'stts' or 'ctts' box or, in case of fragmented media file, in a 'trun' box or in a box for track fragment description. The parameters are, for example, an index (e.g., within a frame, for example the value of a frame index attribute for a G-PCC bit-stream or within a sequence, for example the value of a frame number attribute for a G-PCC bit-stream). It may also be a range of indexes (start, end or first, last) to aggregate points with different timestamps into the same sub-frame.

In another variant, the ATI may contain a time indication, as a decoding time in microseconds, milliseconds, or as timescale units (for example the presentation timescale declared in the MediaHeaderBox 'mdhd' box of the track or a capture timescale in the sub-frame configuration structure). In another variant, the ATI may contain a time range indication, as a decoding time in milliseconds, or as timescale units (for example the timescale declared in the MediaHeaderBox 'mdhd' box of the track or a capture timescale in the sub-frame configuration structure) to aggregate points with different timestamps into a same sub-frame. For aggregated points, the ATI may consist in a time value (in microseconds, milliseconds, or as timescale units) being the average timestamp of the different timestamps. In a variant, the time value for aggregated points is the timestamp of the first point of the aggregated points (the earliest captured one). For aggregated points, the ATI may contain a presentation duration, especially when the time information is not provided as a range.

The timing information, either as an index, a time unit, or as a range of indexes or time units, may be relative to a frame or relative to the point cloud sequence (absolute time in other words).

The ATI may also contain parameters describing the direction of the laser shot as a pair of angles, e.g. (azimuth, elevation) or (theta, phi), or may contain a description of the 3D region containing the points having the same ATI. Alternative embodiments of the metadata structure for ATI in the media file are described later in reference to FIGS. 7 to 11. In a first variant the additional timing information is generated once when the read data are the first data containing the additional timing information. In a variant, the ATI is generated for each attribute data unit with additional timing information.

Next, the data unit is indexed and stored (step 335) as for other data units. Indexing may consist in updating the sample description, especially the sample size, considering the number of bytes for the read data unit. Storage may consist in appending the data unit in a Media Data Box (e.g. 'mdat' or 'idat' or 'imda' box). When the last data unit for a sample is reached (not represented), the sample description is appended in the appropriate sub boxes of the sample table box (or in 'trun' box when media file is fragmented). The above steps are repeated until no more data are to be encapsulated (test 340).

It is to be noted that the sub-frames may be defined with a range of values characterizing a time difference between timing information associated with 3D points of the sub-frames. This may be useful when encoding provides very high granularity (e.g. few microseconds) for frame index attribute and a trade-off needs to be set between access granularity (e.g. millisecond) and byte overhead of the sub-frame description. This trade-off may be defined as part of the configuration step of the encapsulation process.

Figures 4A, 4B, 4C, 5A, 5B:
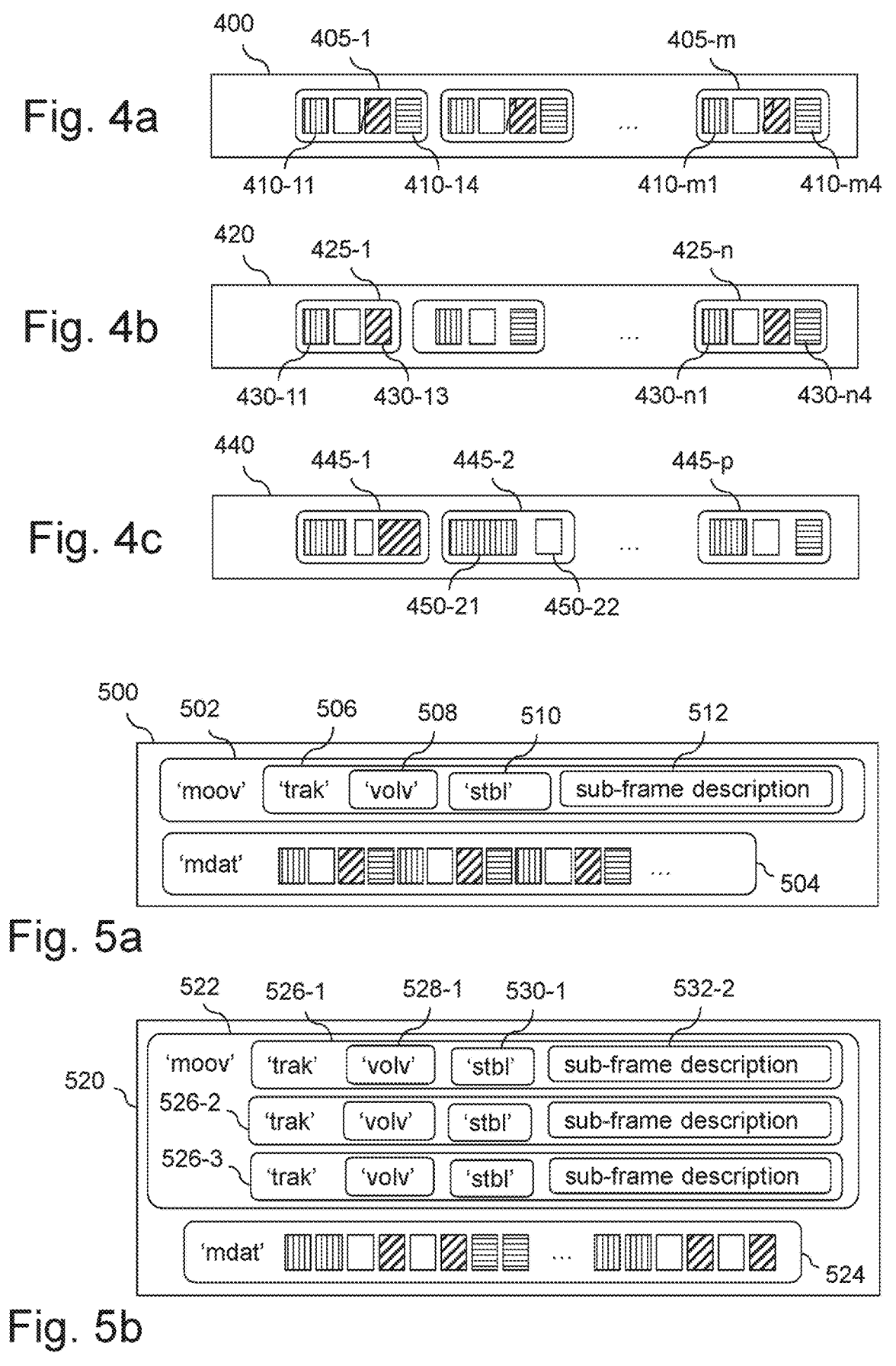

FIGS. 4a, 4b, and 4c illustrate an example of different G-PCC frame and sub-frame configurations.

As illustrated in FIG. 4a, configuration 400 corresponds to point cloud data forming a point cloud sequence comprising several point cloud frames, here point cloud frames 405-1 to 405-m. According to this configuration, each frame is composed of the same number of sub-frames (four in this example), for example sub-frames 410-11 to 410-14 and sub-frames 410-m1 to 410-m4, and the point sampling rate is constant resulting in the same number of points in each sub-frame.

According to the example illustrated in FIG. 4b, configuration 420 corresponds to point cloud data forming a point cloud sequence comprising several point cloud frames referenced 425-1 to 425-n. Each frame is composed of subframes that number may vary from one frame to another. For the sake of illustration, frame 425-1 comprises three subframes referenced 430-11 to 430-13 while frame 425-n comprises four sub-frames referenced 430-n1 to 430-n4. This may come from a different mapping of acquisition or rendering times to sub-frames, considering compression efficiency. Still according to this example, the point sampling rate is constant resulting in a same number of points in each sub-frame.

Configuration 440 illustrated in FIG. 4c corresponds to point cloud data forming a point cloud sequence comprising several point cloud frames referenced 445-1 to 445-p. Each frame may be composed of a different (as illustrated) or the same number of sub-frames and the point sampling rate is not constant resulting in a different number of points in each sub-frame. For example, sub-frame 450-21 of frame 445-2 contains more points than sub-frame 450-22 of the same frame. This may be because the acquisition or rendering time range associated with sub-frame 450-21 is greater than the one of sub-frame 450-22.

FIGS. 5a to 5e illustrate different track organizations for the encapsulation of PCC frames and sub-frames into a media file (the media file being a single file, a fragmented file, or segment files). The illustration uses a single file for the sake of clarity.

The example illustrated in FIG. 5a is directed to a configuration corresponding to a single track encapsulation scheme according to which media file 500 comprises a metadata part ('moov' box 502) and a media data part ('mdat' box 504). Track description 506 describes a volumetric track (e.g. a G-PCC track) as indicated by a 'volv' handler type in handler box 508 of track description 506. Track description 506 also contains sample description (e.g. 'stbl' box 510) and sub-frame description 512, according to embodiments of the invention. The sub-frame description may also be called additional timing information. The sub-frame description may be fully included in sample description 510, in track description 506, or may have a portion within track description 506 and another portion within sample description 510. The track and sample description describe the data units for the considered point cloud sequence according to any configuration described by reference to FIGS. 4a to 4c. For single track encapsulation of G-PCC data in ISOBMFF, the SubSampleInformationBox with flags equal to 0 in SampleTableBox, or in the TrackFragmentBox of each of its MovieFragmentBoxes is present. SubSampleInformationBox with flags equal to 2 (frame index) or 3 (frame_number) in SampleTableBox, or in the TrackFragmentBox of each of its MovieFragmentBoxes may also be present. Embodiments for single track encapsulation are further described in reference to FIGS. 7 to 10.

The example illustrated in FIG. 5b is directed to a configuration corresponding to a multi-track encapsulation scheme using sub-frame tracks wherein media file 520 comprises a metadata part ('moov' box 522) and a media data part ('mdat' box 524), the metadata part ('moov' box 522) containing multiple volumetric tracks referenced 526-1 to 526-3 (e.g. G-PCC tracks) as indicated by a 'volv' handler type in corresponding handler boxes such as handler box 528-1. Each track description contains a sample description (e.g. 'stbl' box 530-1) and a sub-frame description (e.g. sub-frame description 532-2), according to some embodiments of the invention. Again, the sub-frame description may also be called additional timing information. As for other track configurations, the sub-frame description of a track may be fully included in its sample description (e.g. in sample description 530-1), in its description (e.g. in sub-frame description 532-2), or may have a portion within a track description and another portion within a sample description. The track and sample description describe the data units for the point cloud sequence according to any configuration described by reference to FIGS. 4a to 4c. The particular point here is that data are stored as contiguous bytes for sequences of sub-frames, each track describing one or more sequence of sub-frames. For example, track 526-1 describes the sub-frames having a first index, track 526-2 describes the sub-frames having index 2 and 3 while track

526-3 describes sub-frames having index 4. Embodiments for sub-frame tracks are further described in reference to FIG. 11.

Figures 5C, 5D, 5E:
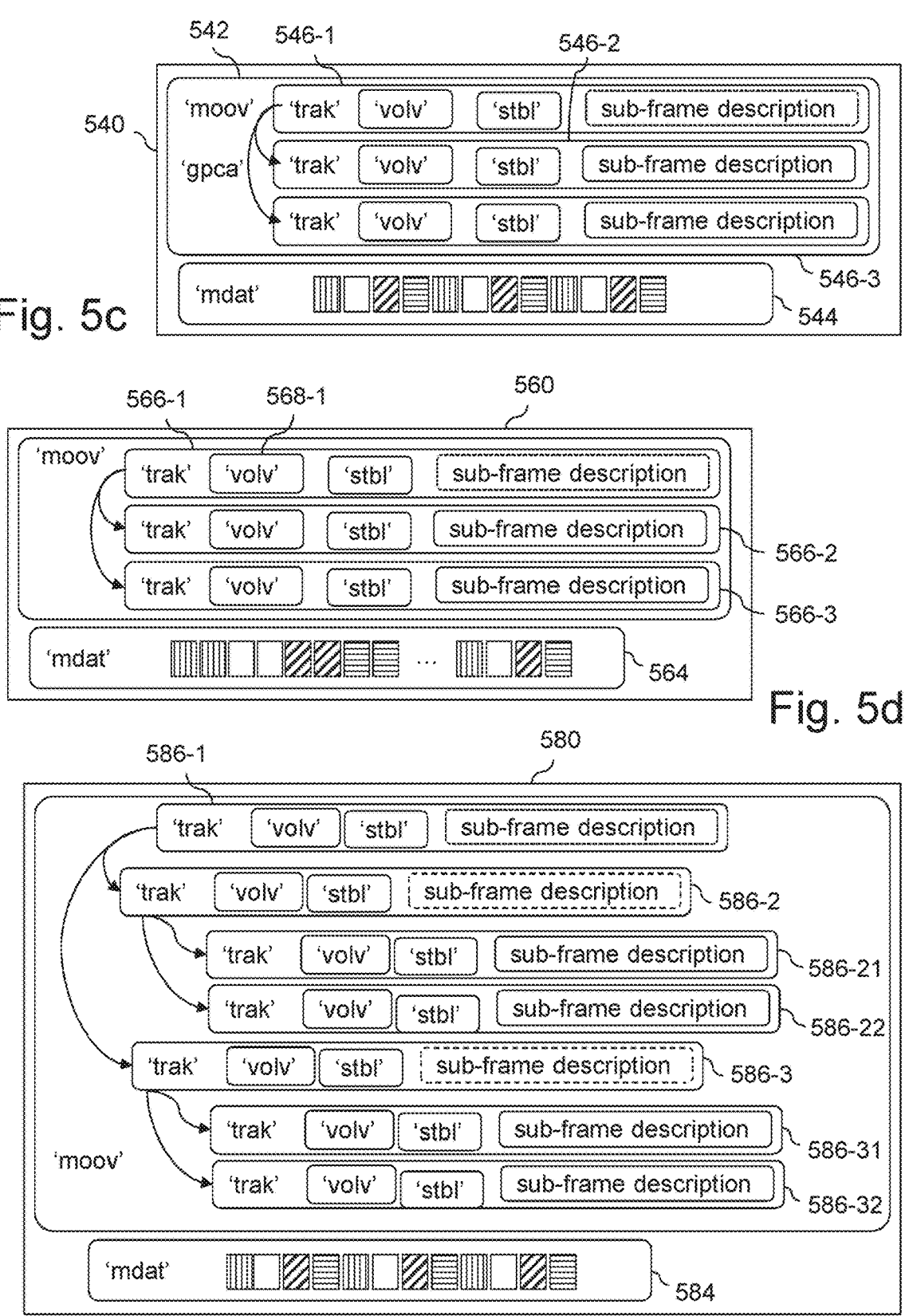

The example illustrated in FIG. 5c is directed to a configuration corresponding to a multi-track encapsulation scheme wherein media file 540 comprises a metadata part ('moov' box 542) and a media data part ('mdat' box 544), the metadata part ('moov' box 542) comprising a geometry track, for example geometry track 546-1 and one or more attribute tracks, for example attribute tracks 546-2 and 546-3. The geometry track 546-1 references the attribute tracks 546-2 and 546-3 via a track reference type 'gpca'. Each track may contain sub-frame description in its track description, in its sample description, or both. The geometry track may contain a metadata structure dedicated to sub-frame configuration information. The sub-frame information allows retrieving sub-frame related data units in 'mdat' box 544 for each geometry and attribute track. For this multi-track encapsulation of G-PCC data in ISOBMFF, when sub-samples are present, SubSampleInformationBox with flags equal to 1 in SampleTableBox, or in the TrackFragmentBox of each of its MovieFragmentBoxes should be present. SubSampleInformationBox with flags equal to 2 or 3 in SampleTableBox, or in the TrackFragmentBox of each of its MovieFragmentBoxes may also be present. SubSampleInformationBox with flags equal to 0 in SampleTableBox, or in the TrackFragmentBox of each of its MovieFragmentBoxes should not be present, because useless (each track conveying its own type of data). The syntax and semantics of the sub-sample with flags equal to 1, 2, or 3 as defined in reference to FIG. 7 applies here.

Configuration 560 illustrated in FIG. 5d corresponds to a multi-track encapsulation of volumetric data with tile tracks (as indicated by the handler box referenced 568-1 having a handler type set to the 'volv' type). For example, track 566-1 is a tile base track referencing one or more tile tracks such as tile tracks 566-2 and 566-3. Each tile track may contain a sub-frame description in its track description, in its sample description, or in both. The sub-frame description allows retrieving sub-frame related data units in the 'mdat' box (e.g. in 'mdat' box 564) for a tile or for a set of tiles. A tile track may contain the description and data corresponding to one or more sub-frames. The tile base track may contain a metadata structure dedicated to sub-frame configuration information (not represented). For this multi-track encapsulation of tiled G-PCC data in ISOBMFF, the SubSampleInformationBox with flags equal to 1 in SampleTableBox, or in the TrackFragmentBox of each of its MovieFragmentBoxes should be present when max_num_tile_ids_in_track>1 or dynamic_num_tiles_flag=1 in the GPCCTileSampleEntry of the track. When a G-PCC tile track carries a single G-PCC component, multiple sub-samples with each sub-sample carrying G-PCC component, which is indicated in the GPCCComponentInfoBox in the sample entry, for a single G-PCC tile, are present. SubSampleInformationBox with flags equal to 0 in SampleTableBox, or in the TrackFragmentBox of each of its MovieFragmentBoxes should not be present. SubSampleInformationBox with flags equal to 1, 2, or 3 in SampleTableBox, or in the TrackFragmentBox of each of its MovieFragmentBoxes may be present. The syntax and semantics of the sub-sample with flags equal to 1, 2, or 3 as defined in reference to FIG. 7 applies here.

Configuration 580 illustrated in FIG. 5e corresponds to a multi-track encapsulation of volumetric data with a tile base track (e.g. tile base track 586-1) referencing one or more geometry tracks like geometry tracks 586-2 and 586-3. Each tile track for geometry information (geometry tile track) may itself reference zero or more attribute tracks like attribute tile tracks 586-21 and 586-22 for track 586-2 and attribute tile tracks 586-31 and 586-32 for track 586-3. As illustrated, each track has a handler box with handler type set to 'volv', indicating volumetric data. Each track may contain a sub-frame description in its track description, in its sample description, or in both. The sub-frame description allows retrieving sub-frame related data units in the 'mdat' box 584 for a given tile or for a set of tiles. A geometry tile track and its associated attribute tile tracks may contain the description and data corresponding to one or more sub-frames. The tile base track may contain a metadata structure dedicated to sub-frame configuration information (not represented) when the configuration is the same for all tiles. Otherwise, a geometry track may contain a metadata structure dedicated to sub-frame configuration information applying to a tile or a set of tiles carried in this geometry track and associated attribute tracks. When a G-PCC tile track carries all the G-PCC components, multiple sub-samples with each sub-sample carrying all G-PCC components of a G-PCC tile may be present. SubSampleInformationBox with any flags value in SampleTableBox, or in the TrackFragmentBox of each of its MovieFragmentBoxes may be present. The syntax and semantics of the sub-sample with flags equal to 1, 2, or 3 as defined in reference to FIG. 7 applies here. It is to be noted that for the different track configuration on FIGS. 5a to 5e, the sub-frame description may use one of the embodiments described in reference to FIG. 7 (use of SubSampleInformationBox) or FIG. 8 (use of sample grouping).

Parsing (De-Encapsulation) Process

FIG. 6 illustrates an example of steps of a parsing process according to some embodiments of the invention, making it possible to identify metadata structures providing ATI in G-PCC tracks and to extract a subset of data corresponding to a G-PCC sub-frame or a set of G-PCC sub-frames. The ATI or sub-frame description also allows extraction of a sample containing specific sub-frames, or frame(s) that have been combined or aggregated (as illustrated with reference 950 in FIG. 9).

As illustrated, a first step 600 consists in receiving the media file to parse. It may be streamed using a streaming module, for example streaming module 134 in FIG. 1 or it may be read from a storage location.

Next, the parser (or de-encapsulation module, such as de-encapsulation module 132 in FIG. 1) is initialized (step 605). The initialization may be carried out by parsing the top-level boxes of the media file, for example the 'moov' box, the 'trak' boxes, and sample description boxes. When the media player contains a decoder (or a decompression module, (e.g. decompression module 136 in FIG. 1), the decoder may also be initialized during this step, for example using decoder configuration information from the sample description (e.g. G-PCC configuration box 'gpcC').

Next, a sample is read (step 610). To that end, the parser (or the de-encapsulation module) reads sample description from the metadata part of the received media file to locate corresponding media data in the media data box of the received media file.

After having read the sample, the parser (or de-encapsulation module) looks for additional timing information or sub-frame description (test 615). Such a test may consist in looking for a metadata structure providing ATI (as described in reference to FIGS. 7, 8, 9, and 10 for a single track or to FIG. 11 for multi-tracks).

If additional timing information is identified, the additional timing information is read (step 620). The parser is then able to determine the presence of a (one or more) partial representation of a point cloud for the frame. Depending on the user settings or applications needs, it may select a partial representation of the point cloud frame if it contains a point cloud representation with appropriate timing precision. In a variant, the parser may select one (or more) partial representation of a point cloud frame to read or to extract (step 625). For G-PCC, it may correspond to one or more G-PCC sub-frames within a G-PCC frame. Based on the ATI, the parser can retrieve the data units corresponding to the selected partial representation of a point cloud frame (step 630), the retrieval may be based on timing information, on spatial information corresponding to a partial representation, or a laser shot direction, any parameter conveyed in the ATI. This variant may require that the compression of the coding configuration of the point cloud frame permits extraction of a subset of units that corresponds to the selected representation, for example slices that are constrained so that the entropy parsing of a data unit may not depend upon the final entropy parsing state of a data unit in the preceding slice, for example setting the entropy_continuation_enabled to value 0 in the G-PCC bit-stream. When this constraint is not fulfilled, the ATI may contain a list of dependencies to follow and process for the extraction of the subset of units that corresponds to the selected representation. There may exist advantageous bit-stream configurations providing access to a given sub-frame, for example when the bit-stream is encoded such that there is at least one GDU per sub_frame_idx, or when a GDU does not contain more sub-frames than an indicated sub-frame index or sub-frame index range in ATI or sub-frame description.

Next, the retrieved data units are transmitted to a decoder, when they are compressed, to a display, or to an application using the point cloud data (step 635).

If no additional timing information is identified, the sample data are read (step 640) and transmitted to a decoder, when they are compressed, to a display, or to an application using the point cloud data (step 635).

As illustrated, these steps are iterated until no more samples are to be read (test 645).

Description of Sub-Frames as Sub-Samples of Point Cloud Tracks

FIG. 7 illustrates encapsulation of additional timing information (ATI) in a sub-sample information box ('subs' box) of a G-PCC track.

Illustrated media file 700 represents a media file (e.g. media file 152 in FIG. 1) encapsulated according to embodiments of the invention. It is depicted as a non-fragmented ISO Base Media File, but it could have been an ISOBMFF fragmented or ISOBMFF segments without changing encapsulation of additional timing information since the 'subs' box is also allowed in movie fragments and in media segment files. According to this embodiment, point cloud data may be encapsulated in a single track, described in 'trak' box 710 of 'moov' box 705, for example as a G-PCC track, as indicated by the sample entry type 'gpe1' referenced 715, 'gpeg', or any other four-character code (4 CC) representing a single G-PCC track.

It is to be noted that a single track embedding a sub-frame description could also be indicated by a specific sample entry type (instead of 'gpe1' 715), not conflicting with other existing four-character codes. This would allow the parser to determine that a volumetric track may provide finer timing information than the sample duration, decoding, or composition time information usually provided in the sample description.

According to a first and a second embodiments, a new value for the flags field dedicated to PCC sub-frame description is used.

According to the first embodiment, the definition of a sub-sample for a G-PCC track is extended as follows to allow sub-frame description in G-PCC tracks: a new value for the flags field of the 'subs' box is defined, for example the value 2 (or any other value not conflicting with other values already in use).

The flags value specifies the type of sub-sample information given in a 'subs' box within a G-PCC track as follows:

0: G-PCC unit based sub-samples. A sub-sample contains only one G-PCC unit (e.g. box 720 in FIG. 7), 1: Tile-based sub-samples. A sub-sample either contains one or more contiguous G-PCC units corresponding to one G-PCC tile or contains one or more contiguous G-PCC units which contain either each parameter set, tile inventory, or frame boundary marker, 2: Sub-frame-based sub-samples. A sub-frame-based sub-sample either contains:
one or more contiguous G-PCC units corresponding to one G-PCC sub-frame or
one or more contiguous G-PCC units corresponding to a set of contiguous G-PCC sub-frames (i.e. a range of frame index or frame number attributes).

Other values of flags are reserved.

codec_specific_parameters field of the SubSampleInformationBox 'subs' box may be extended with a new flags value, as follows:

```
if (flags == 0) {
    unsigned int(8)                         payloadType;
    if (payloadType == 4) { // attribute payload
        unsigned int(6)                     attrIdx;
        bit(18)                             reserved = 0;
    }
    else
        bit(24)                             reserved = 0;
} else if (flags == 1) {
    unsigned int(1)                         tile_data;
    bit(7)                                  reserved = 0;
    if (tile_data)
        unsigned int(24)                        tile_id;
    else
        bit(24)                             reserved = 0;
} else if (flags == 2) {
    unsigned int (32)                       subframe_idx;
}
``` where subframe_idx is an example of ATI as the index of the G-PCC sub-frame-based sub-sample. It may correspond to a value indicated in a frame index attribute in a G-PCC data unit or to a range of values of frame index attributes in G-PCC data units. It provides the index of the sub-frame-based sub-samples within a sample. A reader may use subframe_idx to compute a presentation or composition time for the sub-frame, for example, when the number of sub-frames per sample is constant, considering sample_duration divided by the number of sub-frame per sample in units of the timescale indicated in the MediaHeaderBox or in units of a capture timescale. When the number of sub-frames per sample is variable, the presentation or composition time for the sub-frame may be determined using a look-up table providing per sample or per group of samples the number of sub-frames (the number of sub-frame per sample and capture timescale are example of parameters declared in a metadata structure dedicated to sub-frame configuration information).

However, there may be gaps between subframe_idx values (for example when the media file is edited and some data units for a subframe_idx are removed or when the media file is streamed and some data units are not yet received). A specific value for subframe_idx (for example the value 0xFFFFFFFF) is reserved for sub-samples not mapped to any sub-frame (like sub-samples 730). This may be useful when a point cloud sample does not need to be entirely indexed into sub-frame-based sub-samples (for example, 3D spaces with a very low number of points or 3D spaces where some analytics did not detect any object of interest).

In addition, sub-samples mapped to this specific value may have their discardable parameter set to 1 meaning that these sub-samples are not required to decode the current sample or alternatively sub-samples mapped to this specific value may have their subsample_priority set to 0 indicate low importance of these sub-samples. At the opposite, sub-samples mapped to sub-frames or even tiles (using a subsample information box with flags=1) that may have some interest for an application, or with an important number of points, may have their subsample_priority set to a high value, for example 0xFF. It is also recommended that the subsample_priority for subsamples corresponding to geometry data units is set to a high value or discardable parameters set to 0 to indicate the importance of these units (to obtain points positions) when a subsample information box is present with flags=0.

This embodiment makes it possible to define several sub-sample descriptions in the same track description. For example, a first sub-sample description may be directed to the mandatory (according to MPEG-I Part-18) 'subs' box with flags set to 0 (as illustrated in FIG. 7 with reference 720) and a second sub-sample description may be directed to sub-frame description using a 'subs' box with a flags value set to 2 (as illustrated in FIG. 7 with reference 725). Other sub-sample descriptions may be defined, for example using a 'subs' box with a flags value set to 1 for the mapping of sub-samples to tiles.

Alternatively, subframe_idx may correspond to a value indicated in a frame number attribute in a G-PCC data unit or to a range of values of frame number attributes in G-PCC data units after conversion to an index value within a frame.

In another variant, two new values for the flags field may be defined depending on how the PCC sub-frame is indicated in the bit-stream. For example, the value 2 may indicate that the subframe_idx corresponds to a value indicated in a frame index attribute in a G-PCC data unit or to a range of values of frame index attributes in G-PCC data units and the value 3 may indicate a subframe_number corresponding to a value indicated in a frame number attribute of a G-PCC data unit, or to a range of values of frame number attributes in G-PCC data units.

In another variant, two different flags values may be defined, as follows:

```
if (flags == 0) {
    unsigned int(8)                         payloadType;
    if (payloadType == 4) { // attribute payload
        unsigned int(6)                     attrIdx;
        bit(18)                             reserved = 0;
    }
    else
        bit(24)                             reserved = 0;
} else if (flags == 1) {
    unsigned int(1)                         tile_data;
    bit(7)                                  reserved = 0;
    if (tile_data)
```

-continued

```
         unsigned int(24)              tile_id;
    else
         bit(24)                       reserved = 0;
} else if (flags == 2) {
    unsigned int (32)                  subframe_idx;
} else if (flags == 3) {
    unsigned int (32)                  subframe_number;
}
``` where, if flags is equal to 2, subframe_idx is the index of the sub-frame-based sub-sample and may correspond to a value indicated in a frame index attribute in a G-PCC data unit or to a range of values of frame index attributes in G-PCC data units, and if flags is equal to 3, subframe_number is the number of the sub-frame-based sub-sample within the sequence or track and may correspond to a value indicated in a frame number attribute in a G-PCC data unit or to a range of values of frame number attributes in G-PCC data units.

A reader may use subframe_idx to compute a presentation or composition time for the sub-frame as already described above in reference to FIG. 3.

A reader may use subframe_number to compute a presentation or composition time for the sub-frame. For example, the sampling_rate parameter defined in SubFrameConfigurationGroupEntry may provide the acquisition rate of the 3D sensor expressed in capture_timescale units. In such a case, when the capture of sub-frames is regularly performed according to the sampling_rate parameter specified in SubFrameConfigurationGroupEntry, the timing or presentation time or composition time of the sub-frame may be computed as follows:

$$CT(sub\text{-}frame)=subframe\_number*sampling\_rate/capture\_timescale$$

where CT(sub-frame) is the presentation or composition time for the sub-frame, subframe_number is the value of the frame number attribute of the sub-frame in the sample sequence, and capture_timescale is the number of time units that pass in one second.

Alternatively, the sampling_rate parameter defined in SubFrameConfigurationGroupEntry may provide the acquisition rate of the 3D sensor expressed in the timescale defined in the 'mdhd' box. In such a case, when the capture of sub-frames is regularly performed according to the sampling_rate parameter specified in SubFrameConfiguration-GroupEntry, the timing or presentation time or composition time of the sub-frame may be computed as follows:

$$CT(sub\text{-}frame)=subframe\_number*sampling\_rate/timescale$$

where CT(sub-frame) is the presentation or composition time for the sub-frame, subframe_number is the value of the frame number attribute of the sub-frame in the sample sequence.

Flags values 2 and 3 are examples and may be any value not conflicting with other values already in use.

In another variant, a dedicated parameter may also be defined to signal if the sub-frame identifier is a frame index or a frame number as follows:

```
if (flags == 0) {
    unsigned int(8)                    payloadType;
```

-continued

```
    if (payloadType == 4) { // attribute payload
        unsigned int(6)                attrIdx;
        bit(18)                        reserved = 0;
    }
    else
        bit(24)                        reserved = 0;
} else if (flags == 1) {
    unsigned int(1)                    tile_data;
    bit(7)                             reserved = 0;
    if (tile_data)
        unsigned int(24)               tile_id;
    else
        bit(24)                        reserved = 0;
} else if (flags == 2) {
    unsigned int (1)                   subframe_id_type;
    unsigned int (31)                  subframe_id;
}
``` where, if flags is equal to 2 (or any value not conflicting with other values already in use), subframe_id_type indicates if set to 0, subframe_id is the index of the sub-frame-based sub-sample within a frame and may correspond to a value indicated in a frame index attribute in a G-PCC data unit or to a range of values of frame index attributes in G-PCC data units; and if set to 1, subframe_id is the number of the sub-frame-based sub-sample within the sequence or track and may correspond to a value indicated in a frame number attribute in a G-PCC data unit or to a range of values of frame number attributes in G-PCC data units.

In another variant, sub-frame indication can be signalled using the SubSampleInformationBox 'subs' with an existing flags value, for example with the flags value 0 signalling the G-PCC unit based sub-samples. For example, the syntax of 'subs' with flags value=0 could be defined as follows:

```
if (flags == 0) {
    unsigned int(8)                    payloadType;
    if (payloadType == 4) { // attribute payload
        unsigned int(6)                attrIdx;
        bit(1)                         subframe_id_type;
        bit(16)                        subframe_id;
        bit(1)                         reserved = 0;
    }
    else
        bit(1)                         subframe_id_type;
        bit(16)                        subframe_id;
        bit(7)                         reserved = 0;
    }
}
``` where subframe_id_type indicates whether the subsample contains G-PCC sub-frame which is associated with frame number attribute or frame index attribute.

if subframe_id_type is set to 0, subframe_id is the index of the sub-frame-based sub-sample within a frame and corresponds to a value indicated in a frame index attribute in a G-PCC data unit or to a range of values of frame index attributes in G-PCC data units; and if subframe_id_type is set to 1, subframe_id is the number of the sub-frame-based sub-sample within the sequence or track and corresponds to a value indicated in a frame number attribute in a G-PCC data unit or to a range of values of frame number attributes in G-PCC data units.

According to the second embodiment, wherein a new flags value dedicated to PCC sub-frame description is used, still using a new flags value set for example to 2 and with same features of the first embodiment, the subframe_idx is described as a pair of values:

```
    } else if (flags == 2) {
        unsigned int (16)   frame_idx_start;
        unsigned int (16)   frame_idx_end;
    }
``` where frame_idx_start indicates the lowest value of the frame index attribute contained in the group of subframe-based sub-sample; and frame_idx_end indicates the highest value of the frame index attribute contained in the group of subframe-based sub-sample. It is to be noted that this second parameter may be coded as a difference from the frame_idx_start.

Similarly to previous variants, the frame indexes (represented by frame_idx_start and frame_idx_end) may represent frame numbers and/or a flag parameter or new flags values may be defined to differentiate signalling between frame index from frame number attribute values.

According to third embodiment wherein the sub-frames are described as sub-samples of point cloud tracks, an existing flags value for PCC is reused sub-frame description.

According to this embodiment, an existing flags value, for example the value 1 currently used for tile-based subsamples is reused, instead of using a new flags value, such as flags value 2. The syntax could be adapted to handle tile or sub-frame indexation. The semantics may be the following:

```
    } else if (flags == 1) {
        unsigned int(2)             data_type;
        bit(6)                      reserved = 0;
        if (data_type == 1)
            unsigned int(24)            tile_id;
        else if (data_type == 2) {
            unsigned int(24) subframe_idx;
        else
            bit(24)                     reserved = 0;
        }
    }
``` where subframe_idx has the same semantics as the one described by reference to the first embodiment.

The parameter called data_type indicates the type of data represented by the G-PCC units. When it is set to 1, it indicates that the sub-sample contains G-PCC units which contain either geometry data units or attribute data units, that corresponds to one G-PCC tile. When it is set to 2, it indicates that the sub-sample contains G-PCC units which contain either geometry data unit or attribute data unit, that corresponds to one or more G-PCC sub-frames.

Otherwise, it indicates that the sub-sample contains G-PCC units which contain either each parameter set, tile inventory, or frame boundary marker.

The new syntax remains backward compatible with the previous syntax and semantics of previous tile_data parameter.

This embodiment may be used when either tile or sub-frame information is present in the point cloud data to encapsulate. When both tiles and sub-frames are used, the first or the second embodiment may be preferred.

However, when the encoding is configured to allow extracting G-PCC units corresponding to one G-PCC sub-frame, using an advantageous tile/slice/GPCC-units set up would allow this variant to be used without penalty. For example, a slice contains one geometry and zero or more attribute data units for one sub-frame and there may be a tile corresponding to one or more slices, so that the value of subsample_count in the 'subs' box corresponds to the number of sub-frame-based sub-samples.

It is to be noted that in any variant of this embodiment, the subframe_idx parameter may be replaced by other type of information like for example a timing information for a sub-frame-based sub-sample or a pair of (azimuth, elevation) angles, a region identifier if regions are defined in the track, any information describing a sub-frame-based sub-sample or additional timing information provided that it can be represented on 32 bits (the size of the codec_specific_parameter field in the 'subs' box). In case ATI requires more than 32 bits for its description, a new version (for example, version=2) of the subs box may be defined to allows more bits for the codec_specific_parameter, as follows:

```
aligned(8) class SubSampleInformationBox
    extends FullBox('subs', version, flags) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if(version == 1 || version == 2)
                {
                    unsigned int(32) subsample_size;
                }
                else
                {
                    unsigned int(16) subsample_size;
                }
                unsigned int(8) subsample_priority;
                unsigned int(8) discardable;
                unsigned int(32) codec_specific_parameters;
                if(version == 2)
                    unsigned int(32) codec_specific_parameters_extension;
            }
        }
    }
}
``` where the codec_specific_parameters_extension is defined by the codec in use and should be interpreted as additional information to the codec_specific_parameters for a type of sub-samples determined by the flags value of the 'subs' box. This allows, for example, to indicate, for a sub-frame based sub-sample, timing information in the codec_specific_parameters and laser shot orientation in the codec_specific_parameters_extension, or any combination of possible parameters for the ATI.

Mapping of Data Units to PCC Sub-Frame Description in Point Cloud Tracks

Figure 8:
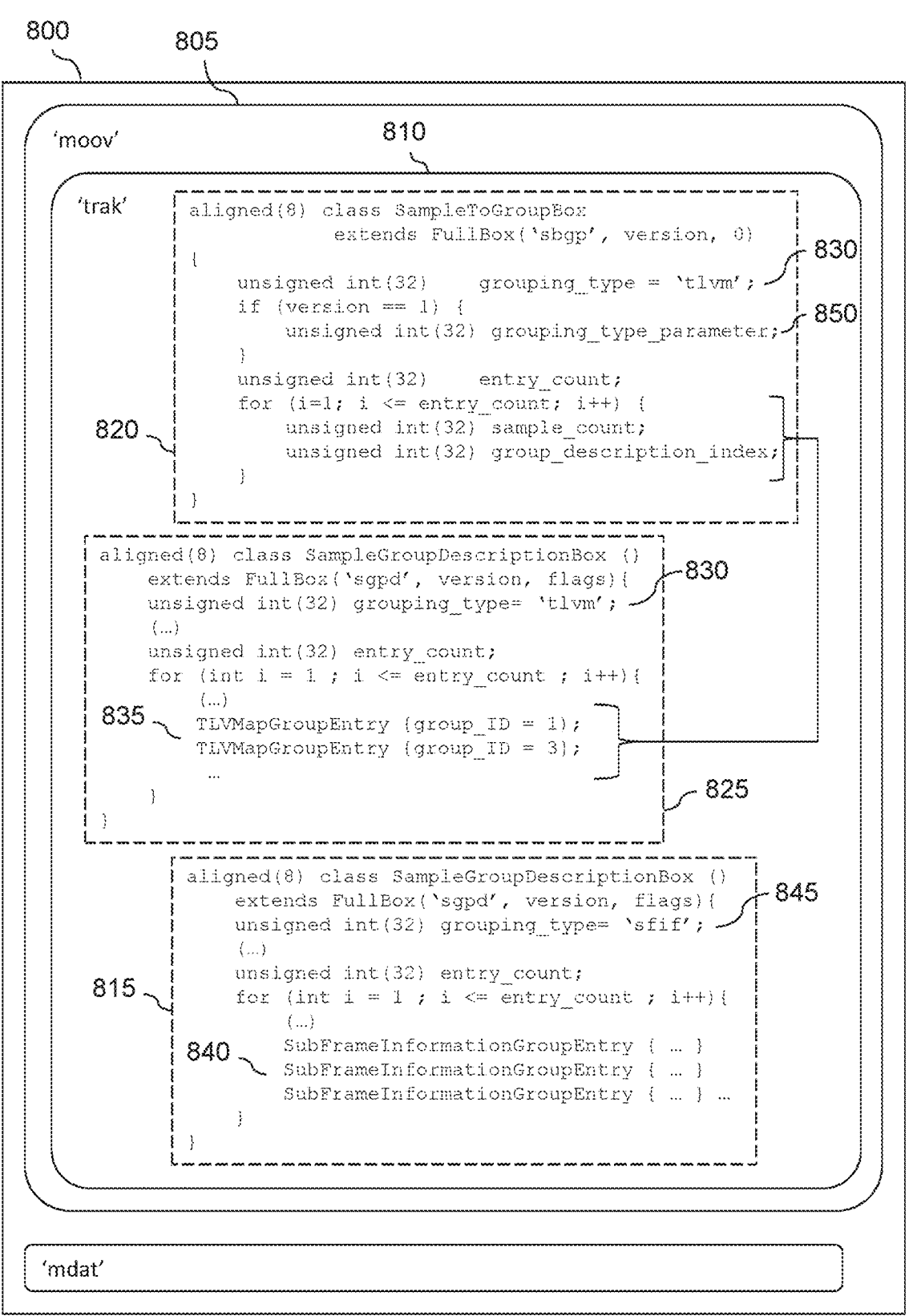
FIG. 8 illustrates a media file having a G-PCC track containing an additional timing information (ATI) description defined in a sample group description box that is used with a G-PCC unit mapping sample group.

FIG. 8 illustrates a media file 800 (e.g. a media file 152 in FIG. 1) having a G-PCC track described in 'trak' box 810 of 'moov' box 805, containing an additional timing information (ATI) or sub-frame description defined in a sample group description box 815 that is used with a G-PCC unit mapping sample group (references 820 and 825).

For the sake of clarity and regarding their use here, it is considered in the following that that "G-PCC units" are equivalent to "TLV units".

According to this embodiment, the file writer (e.g. file writer 100 in FIG. 1) generates a first sample grouping to map samples onto entries with different TLV unit patterns. This first sample grouping results in a TLV mapping sample group indicated, for example, by a grouping_type='tlvm' (here reference 830) in a SampleToGroupBox box (here 'sbgp' box 820) and in an associated SampleGroupDescriptionBox box (here 'sgpd' box 825). As illustrated, Sample- ToGroupBox 820 defines a group of samples and for each group, indicates an entry (reference 835) in the SampleTo-GroupDescriptionBox 830. Each entry 835 is a specific VolumetricVisualSampleGroupEntry, called TLVMapGroupEntry. A TLVMapGroupEntry can be used to map a range of contiguous TLV units into an entry in a second 'sgpd' box. By default, this second 'sgpd' box may be a SampleGroupDescriptionBox with grouping type indicating that the box contains SubFrameInformationGroupEntry (reference 840), for example the grouping type 'sfif' (sub-frame information) as illustrated with reference 845. A SubFrameInformationGroupEntry (reference 840) is also a specific kind of VolumetricVisualSampleGroupEntry. When several TLV mappings are in use in a same GPCC track, the grouping_type_parameter (reference 850) of the SampleToGroup with grouping_type 'tlvm' may be set equal to the four-character code of 'sgpd' box 815 ('sfif' in this example) to explicitly indicate into which kind of volumetric sample group entries the TLV units are mapped. According to the example illustrated in FIG. 8, setting grouping_type_parameter 850 to 'sfif' indicates that TLVMapGroupEntries 835 map a range of contiguous TLV units to an entry in 'sgpd' box 815 of the 'sfif' type.

TLVMapGroupEntry (e.g. TLVMapGroupEntry 835) may be defined as follows.

The TLVMapGroupEntry may be used to assign an identifier, called groupID, to each TLV unit. The TLVMapGroupEntry, when present, may be linked to a sample group description providing the semantics of that groupID. This link may be provided by setting the grouping_type_parameter of the SampleToGroupBox of the 'tlvm' type to the four-character code of the associated sample grouping type. Consequently, a SampleToGroupBox of 'tlvm' type may never use version 0 of the box.

A PCC track should not contain both a SampleToGroupBox of the 'tlvm' type associated with a grouping_type_parameter equal to a particular value groupType and a SampleToGroupBox of the groupType type. When a track contains a SampleToGroupBox of the 'tlvm' type associated with a grouping_type_parameter groupType, TLV units of the mapped sample are indirectly associated with the sample group description of type groupType through the groupID of the TLVMapGroupEntry applicable for that sample. When a track contains a SampleToGroupBox of type groupType, each sample is directly mapped to the sample group description of type groupType through the SampleToGroupBox of type groupType and all TLV units of the mapped sample are associated with the same groupID.

The syntax of TLVMapGroupEntry may be defined as follows:

```
class TLVMapGroupEntry ( ) extends
VolumetricVisualSampleGroupEntry ('tlvm') {
    bit(6) reserved = 0;
    unsigned int(1) large_size;
    unsigned int(1) rle;
    if (large_size) {
        unsigned int(16) entry_count;
    } else {
        unsigned int(8) entry_count;
    }
    for (i=1; i<= entry_count; i++) {
        if (rle) {
            if (large_size) {
                unsigned int(16) TLV_start_number;
            } else {
                unsigned int(8) TLV_start_number;
            }
```

-continued

```
        }
        unsigned int(16) groupID;
    }
``` with the following semantics:

large_size indicates whether the number of TLV units entries in the track samples is represented on 8 or 16 bits, rle indicates whether run-length encoding is used (for example value 1) to assign groupID to TLV units or not (for example value 0), entry_count specifies the number of entries in the map. It is noted that when rle indicates that run-length encoding is used, the entry_count corresponds to the number of runs where consecutive TLV units are associated with the same group. When rle indicates that run-length encoding is not used, entry_count represents the total number of TLV units, TLV_start_number is the 1-based TLV unit index in the sample of the first TLV unit in the current run associated with groupID, and groupID specifies the unique identifier of the group. All TLV units mapped to the same group with a particular groupID value have the same properties in all the sample groups that indicate a mapping to that particular groupID value and are contained in this track. More information about the group is provided by the sample group description entry with this groupID and grouping_type equal to the grouping_type_parameter of the SampleToGroupBox of type 'tlvm'.

A SubFrameInformationGroupEntry (e.g. SubFrameInformationGroupEntry 840) may be defined as follows:

```
class SubFrameInformationGroupEntry ( ) extends
VolumetricVisualSampleGroupEntry ('sfif') {
    unsigned (32) frame_index;
    // or alternatively to a single frame_index :
    unsigned (32) frame_start_index;
    unsigned (32) frame_index_end;
    // other optional or alternative parameters
    3DBoundingBox region; (or reference to an existing one via a
    region identifier parameter)
    unsigned int(32) decoding_time;
    // a laser shot direction
    unsigned int(32) azimuth_angle;
    unsigned int(32) elevation_angle;
    // Random accessible subframe or not:
    unsigned int(1) random_accessible;
    unsigned int(7) reserved=0;
    if (random_accessible = 0) {
    unsigned int (8) num_dependencies;
        unsigned int (32) dependent_subframes [num_dependencies];
    }
}
``` where frame_index is the index of the sub-frame. It may correspond to a value indicated in a frame index attribute in a G-PCC data unit. When instead of a single frame index, two frame index values are indicated, the frame_index_start and frame_index_end indicate a range of values of frame index attributes in G-PCC data units, mapped onto a sub-frame at file format level.

Alternatively, instead of indicating a frame index of the sub-frame within a frame, a frame number of the sub-frame may be indicated within the sequence or track. It may correspond to a value indicated in a frame number attribute in a G-PCC data unit or to a range of values of frame number attributes in G-PCC data units after conversion to an index value within a frame Other parameters like the followings may be used to describe a sub-frame at file format level:

a decoding time, that may be expressed as timescale (number of timestamp values that represent a duration of one second) units, reusing the timescale declared in the movie header box of the media file. The timescale should then be computed so that sampling rate for PCC frames and PCC sub-frames can be expressed as units of this timescale, an orientation of the sensor as a pair of angles that led to the generation of the points in a sub-frame, for example as an azimuth and elevation angle in degrees units or as a factor of angle resolution that can be encoded as a parameter of the sensor in some configuration information, and an indication on whether a sub-frame can be randomly accessed i.e. it can be independently decoded of other sub-frames within the frame. When random_accessible is set to 0, the sub-frame descriptor may contain a list of dependencies (the dependent_subframes array parameter), possibly as sub-frame indexes onto which the sub-frame depends. The number of depended sub-frames may be indicated as another parameter in the sub-frame descriptor.

On parsing side, when structures like boxes 815, 820, and 825 in FIG. 8 are present in a media file, a media player may retrieve sample by sample the TLV units corresponding to a sub-frame by inspecting the entries of 'sgpd' box 815. Then, from these entries, the player may select one or more sub-frames (as described with reference to step 625 in FIG. 6), based on sub-frame description parameters. The one or more identified entries (referenced 840 in FIG. 8) are kept in memory (to apply to following samples if selection criteria do not change over time, otherwise the step is repeated on a sample basis) and the TLV units mapped to the identified entries can be selected for output, rendering or transmission.

OTHER EMBODIMENTS

According to particular embodiments, metadata structure dedicated to sub-frame configuration information (also called sub-frame configuration structure) may indicate the presence of additional timing information within a track. For instance, the metadata structure dedicated to sub-frame configuration information (e.g. SubFrameConfiguration-Box, GPCCConfigurationBox, or GPCCDecoderConfigura-tionRecord) may include an additional parameter, for example the additional_timing_information_flag parameter, indicating the presence of Frame Index or Frame Number Attribute units. This avoids, for parsers, to check the attribute types and identify presence or not of frame index or frame number attributes. It also warns parsers when this parameter is set to 1, that ATI may be present in a track (for step 615). In a variant, the presence of Frame Index or Frame Number Attribute units may be indicated in (by a writer) or determined from (by a parser) a GPCCComponentInfoBox with a gpcc_type value equal to 4 and attr_type equal to 3 or 4, respectively to indicate frame index or frame number attributes. This parameter or the presence of attr_type=3 or 4 in the GPCCComponentInfoBox may be exposed as a parameter in a MIME type to inform players on the presence of additional timing information. When the media file is for streaming, the presence of additional timing information may be indicated in a codec attribute of a DASH Representations describing a G-PCC track. Optionally, a DASH Representation for a sub-frame track may contain a DASH descriptor as a SupplementalProperty or EssentialProperty with a specific scheme_id_uri attribute's value indicating that sub-frame information is provided and a value attribute indicating the one or more values of sub-frame index comprised in the sub-frame track. Having indication of the presence of sub-frames at file format level could be useful in several applications: for example, to determine that one sample may contain several frames. The application could then initialize the buffer for displaying the multiple point cloud frames. In addition, this indication is necessary to envisage the access to a sub-representation of the point cloud based on an acquisition time (and not the sample time that may depend on compression choices).

According to other embodiments, the metadata structure dedicated to sub-frame configuration information may indicate constraints for the additional timing information associated with points of a sample. For instance, a cross_sam-ple_reordering flag may specify when equal to 0 that the timing information of all points of a sample indicates a timing in the range of the sample_time to the sum of sample_time and sample_duration inclusive, wherein sample_time is the start time of the sample and sample_du-ration is the duration of the sample. In other words, it indicates that sub-frame presentation or composition times in a given sample should not exceed the presentation or composition time of the sample immediately following this given sample. When equal to 1, the flag specifies that the timing of the points in a sample may or may not be in the range of the sample_time to the sample_time plus the sample_duration inclusive. This flag may be used to determine if the reordering of the points after decoding of the point cloud should be done after decoding of a single sample or not. This allows a player to reorder frames contained within a combined frame. In a variant, when the cross_sa-mple_reordering flag equal to 1, the additional timing information description may further describe the minimal number of consecutive samples needed to reorder the points of point cloud according to the additional timing information. Having a flexibility in the ordering of frames within a combined frame may be useful to optimize the compression.

In a variant of the described embodiments, the metadata structure dedicated to sub-frame configuration information may further describe the characteristics of the timing associated with the points of a sample. It can be for example a number of different timing values within a sample. For instance, each timing value may correspond to a sub-frame within the sample. For instance, it may indicate the number of different frame numbers or frame indexes values present within a sample. In a variant, it may also indicate the maximum number of different timing within a sample or the minimum number. In another variant, when the information is a frame index, the additional timing information description may indicate the maximum range of frame index values.

In yet another embodiment, the metadata structure dedicated to sub-frame configuration information may indicate whether the encoding of the samples allows accessing to a partial representation of the point cloud frame that is associated with a particular value of timing. Typically, it can be specified using an additional parameter, for example named subframe_accessible_type parameter. When set to 0, no access to a partial representation is possible. When set to 1, access to a partial representation is possible (but may require to decode more units than the units associated with this partial representation. This may require parser or reader to check possible dependencies between sub-frames or partial representations, for example indicated as ATI. When set to 2, access to and extraction of a partial representation are possible (the partial representation is decodable without data units from other partial representations). When set to 3, access to a partial representation is possible but requires bit-stream inspection (in other words, access to the partial representation is not described in the metadata part of the media file).

Packing Sub-Frames or Sample Aggregation in Point Cloud Tracks

FIG. 9 illustrates a media file 900 (e.g. media file 152 in FIG. 1) having a single G-PCC track described in 'trak' box 910 of 'moov' box 905, containing a sub-frame description through packing (or interleaving) of samples. These specific samples are described as volumetric sample entry types 920 in the sample description box 'stsd' referenced 915. Then, the additional timing information may be provided in the sample description.

According to this embodiment, a sub-frame is encapsulated as a sample, meaning that it has its own byte offset, number, duration, and size indication in the sub-boxes of the Sample Table Box ('stbl') referenced 925 (or in track fragment boxes when the media file is fragmented). This is illustrated in the 'mdat' box 930: data units (TLV or PCC units) corresponding to a sub-frame (with same frame index attribute value or within a range of frame index attribute values, depending on the encapsulation settings) are stored one after the other and indexed as a sample.

In order to provide a full point cloud frame access, sample entry 920 or sample description box 915 may contain a specific metadata structure 935 providing information on how the sub-frames carried in a run of consecutive samples are packed or interleaved to form full point cloud frames and/or information for identifying the grouping_type value of the sample group used to group together subframes belonging to a same point cloud frame (the 'sfif' grouping type in box 935). This sample group may be a compact sample group such as compact sample group 940 that defines one or more patterns describing how samples are packed or interleaved and, for each element of the pattern (a sample), provides an index in a sample group description box (e.g. 'sgpd' box 945). The entries of 'sgpd' box 945 are subframe descriptor indicated here as SubFrameInformationGroupEntry ('sfif') as described in reference to FIG. 8 (reference 840). The composition time of a G-PCC frame resulting from the combination of a run of consecutive samples coincides with the composition time of the last sample in the run. In a variant, the composition time of a G-PCC frame resulting from the combination of a run of consecutive samples coincides with the composition time of the first sample in the run. The duration of a G-PCC frame resulting from the combination of a run of consecutive samples is the sum of the duration of these consecutive samples. This encapsulation mode may be used in cases, e.g., where two or more point cloud frames have been combined together to form a single point cloud frame, for the sake of compression efficiency.

Alternatively, when sub-frame descriptor describing ATI associated with each sub-frame is not needed by the application, but only access to sub-frames or full frame is needed, the combined frame (reference 950) that is encoded may be encapsulated as packed or interleaved samples, where the frames are stored as one or more samples in a track (e.g. track 910), thus allowing a finer temporal access, at sub-frame level, through the PackedSampleDescriptionBox 935 signaling that sub-frames in consecutive samples are grouped together using a sample grouping of type 'gfra' (referenced 921 in FIG. 9) indicating how to access to a GPCC frame, as follows:

Grouping Type: 'gfra'
    Container: Sample Group Description Box ('sgpd')
    Mandatory: No
    Quantity: Zero or one per track A sample group with grouping_type 'gfra' allows signaling runs of consecutive samples, each run of consecutive samples forming a G-PCC frame.

Each sample shall contain data corresponding to one or more GPCC sub-frames (for example like the data units in track 930).

A GPCC frame results from the combination of the data of all samples belonging to a same run of consecutive samples.

The composition time of a G-PCC frame resulting from the combination of a run of consecutive samples coincides with the composition time of the last sample in the run. In a variant, the composition time of a G-PCC frame resulting from the combination of a run of consecutive samples coincides with the composition time of the first sample in the run. The duration of a G-PCC frame resulting from the combination of a run of consecutive samples is the sum of the duration of these consecutive samples.

The grouping_type_parameter may not be set to any particular value for the SampleToGroupBox with grouping type 'gfra':

```
aligned(8) class GPCCFrameEntry( ) extends
VolumetricVisualSampleGroupEntry ('gfra')
{
}
```

In an alternative, both sample grouping 'sfif' and 'gfra' may be defined in a track containing an interleaved of subframes in consecutive samples.

Description of Sub-Frames Using Data Entries

Figure 10:
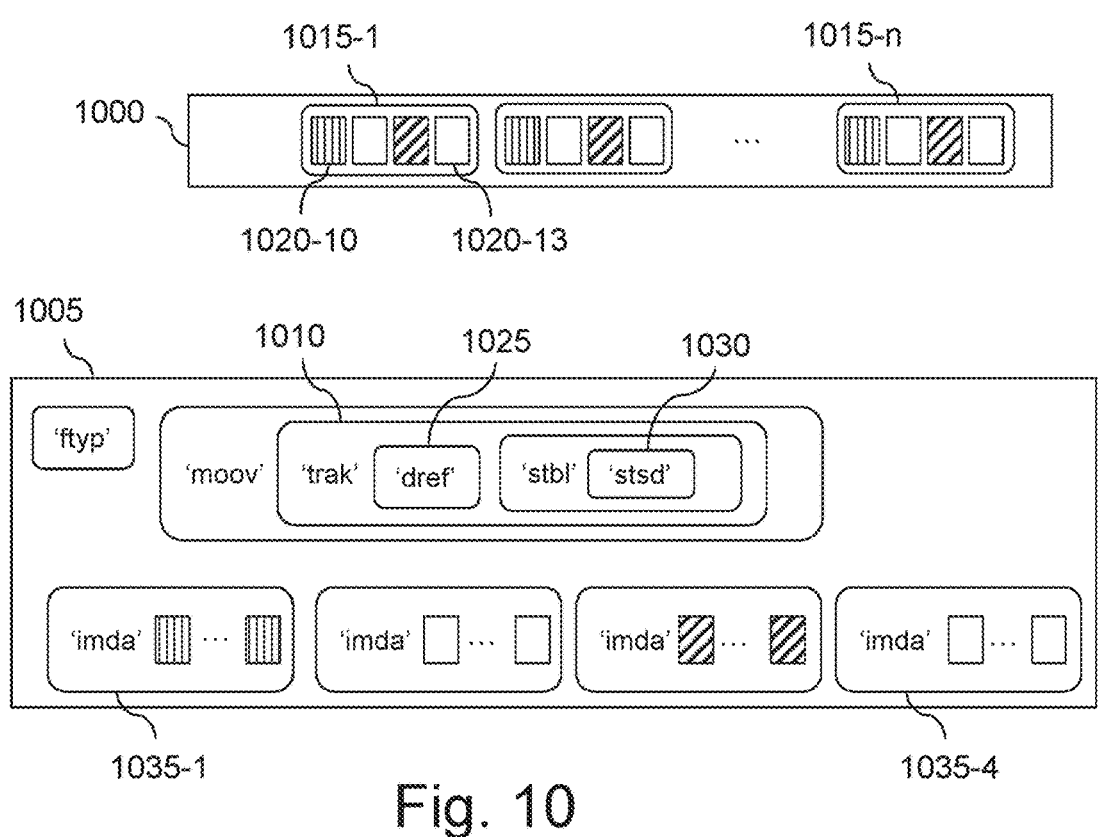
FIG. 10 illustrates an example of the organization of point cloud data to encapsulate and a resulting encapsulated media file, using a single PCC track, providing sub-frame description and access.

FIG. 10 illustrates an example of the organization of point cloud data 1000 (e.g. point cloud data 150 in FIG. 1) to encapsulate and a resulting encapsulated media file 1005 (e.g. media file 152 in FIG. 1), using a single PCC track referenced 1010, providing sub-frame description and access. According to the illustrated example, the point cloud data to encapsulate contains a set of PCC frames referenced 1015-1 to 1015-n. Still according to the illustrated example, each PCC frame contains four sub-frames. For example, frame 1015-1 contains sub-frames 1020-10 to 1020-13. Each sub-frame has a sub-frame index or frame number, for example starting at 0, incremented by 1 from one sub-frame to another within the PCC frame for frame index and within the sequence for frame number.

According to this embodiment, the track description 1010 contains a DataReferenceBox 'dref' referenced 1025 that contains a table of data references (for example URLs). The purpose of the 'dref' box is to declare the location(s) of the media data used within the presentation or media file. A data reference box like 'dref' box 1025 contains at least one data entry box. There exist several kinds of data boxes, the default one being used to indicate that media data are present in the media file in the 'mdat' box. The data entries in 'dref' box 1025 are referenced in sample description box like 'stsd' box 1030. Other kinds of data entries inform parsers that there may be identifiable media data box, e.g. 'imda' box, like 'imda' boxes 1035-1 to 1035-4 that store the data for samples referencing this type of data entry in their sample description (i.e. in 'stsd' box 1030). In this embodiment, a new DataEntry box is proposed to indicate that data are stored in an identified media data box based on a sub-frame sequence number. The sequence number applies to the frame index or frame number of point cloud sub-frames. When sub-frame indication comes as a frame index attribute, the sequence number for a sub-frame in a frame N is equal to the frame_index of the sub-frame plus the frame index for the last sub-frame of frame N−1 (in other words, the frame index is transformed into an absolute frame number, instead of a frame relative one). Then, the data for a sample referencing this new DataEntry may be split into 'imda' boxes so that data for a sub-frame with index Si is stored in an 'imda' box having its imda_identifier parameter set to the sub-frame index Si. This results in sub-frames stored in different media data box and allows collecting data for a sequence of sub-frames as a contiguous byte range. The new data entry type may be defined as follows:

```
aligned(8) class DataEntrySubFrameIndexBox (bit(24) flags)
    extends DataEntryBaseBox ('sfix', flags) {
}
``` wherein DataEntrySubFrameIndexBox identifies the IdentifiedMediaDataBox containing the media data accessed through the data_reference_index corresponding to this DataEntrySubFrameIndexBox. When a data_reference_index included in a sample entry refers to DataEntrySubFrameIndexBox, each sample referring to the sample entry may have its data split into a number of IdentifiedMediaDataBox corresponding to the number of sub-frames within this sample (this number may be indicated or obtained in a metadata structure dedicated to sub-frame configuration information). The media data offset 0 points to the first byte of the payload of the IdentifiedMediaDataBox that has imda_identifier equal to the sub-frame number modulo the number of sub-frames per sample.

Multi-Track Encapsulation for Sub-Frame Tracks

Figure 11:
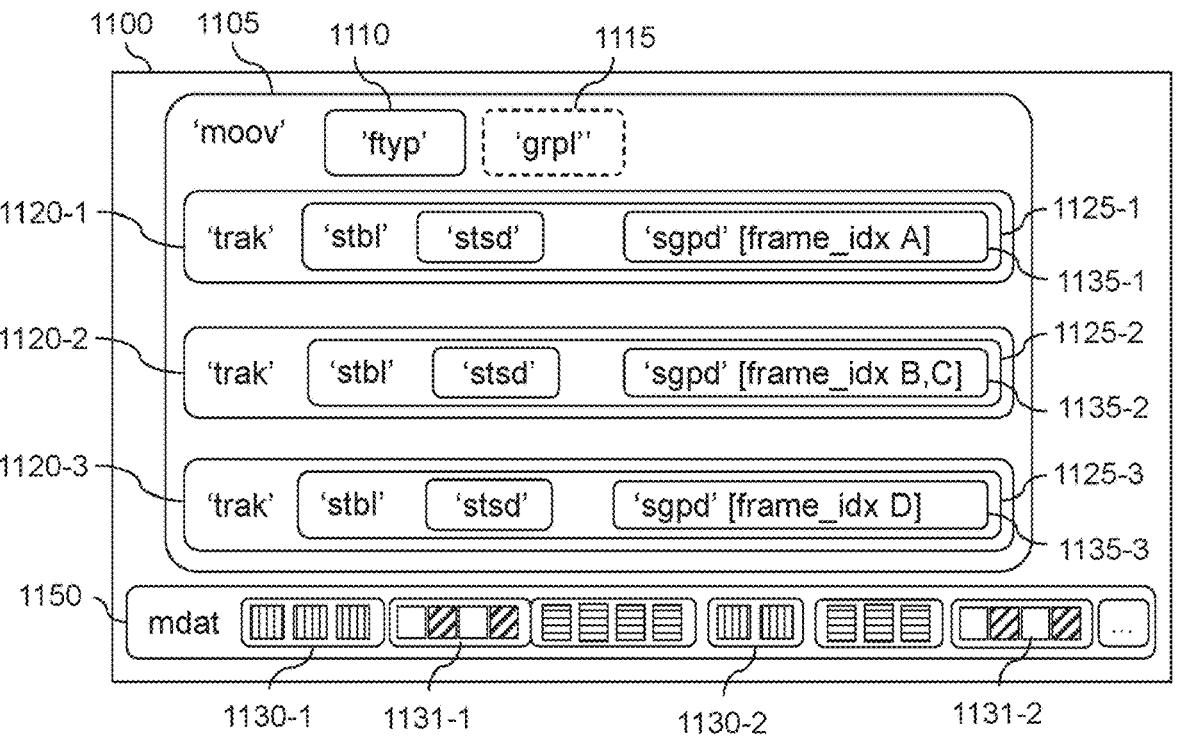
FIG. 11 illustrates an encapsulated media file with multiple PCC tracks, based on sub-frames.

FIG. 11 illustrates an encapsulated media file 1100 (e.g. media file 130) with multiple PCC tracks, based on sub-frames.

As illustrated, media file 1100 contains a metadata part represented by movie box 'moov' 1105 and a media data part represented by 'mdat' box 1150. The 'moov' box contains 'ftyp' box 1110 and optionally a GroupListBox box 'grpl' referenced 1115. This GroupListBox may declare a group of sub-frame tracks (e.g. sub-frame tracks 1120-1 to 1120-3) encapsulating point cloud data from a same point cloud sequence (e.g. point cloud data 150 in FIG. 1). This can be done by defining in this 'grpl' box an entity group listing sub-frame tracks from a same point cloud sequence. A new entity grouping type may be defined for this specific use of EntityToGroupBox, for example the 'sfgp' type, for sub-frame group. An entity group of this type may reference sub-frame tracks in its list of entity_ID. Each frame in this sequence is encapsulated into samples of sub-frame tracks, each sample representing a consistent set of points from sampling or timing point of view within a frame of the point cloud sequence. Each sub-frame track contains a sample description (with at least a sample table box (e.g. 'stbl' boxes 1125-1 to 1125-3 and a sample description box 'stsd'). The 'stsd' box may contain a specific sample entry type indicating that samples of this track contains a partial representation, or partial sample, corresponding to a set of points, from a point cloud frame sharing common properties, like for example timing information.

The common properties and their type, for example timing information, may be indicated in a sample group description ('sgpd' and optionally a 'sbgp' boxes, not represented) with a specific grouping-type, for example for providing sub-frame information. It may be indicated, for example, by the four-character code 'sfif' (or any other value, not conflicting with other 4 CC already in use). The 'sgpd' box may contain any variant of the SubframeInformationGroupEntry as described in reference to FIG. 8 (reference 840) or 9 (within box 945). The properties contained in a 'sgpd' box of a sub-frame track associate properties to group of samples in the 'mdat' box (e.g. 'mdat' box 1150). For example, track 1120-1 describes samples corresponding to a sub-frame with index "A" having samples indicated with references 1130-1 and 1130-2. Similarly, tracks 1120-2 and 1120-3 describe samples corresponding to a sub-frame with index "B" or "C" and samples corresponding to a sub-frame with index "D" respectively.

Data in 'mdat' box 1150 come as bursts of consecutive samples for a given sub-frame (e.g., 1130-1 and 1130-2) or a given set of sub-frames (e.g., 1131-1 and 1131-2) corresponding to a track. The sample description boxes 1125-1 to 1125-3 provide byte offsets and lengths to access samples corresponding to a sub-frame or a set of sub-frames. It is to be noted that the same would apply with track fragments and track run boxes in case of a fragmented media file. Each sub-frame track contains the different data units for the point cloud data (i.e. parameter sets, geometry, and attributes).

As an alternative to the 'grpl' box 1115, each track may register itself in a track group, using a TrackGroupBox (not represented) with a new track grouping type. For example, the 4 CC 'sfgp' may define a group of sub-frame tracks that when combined together lead to the reconstruction of a complete point cloud frame. It is to be noted that it may also be possible to combine a subset of sub-frame tracks within a group of sub-frame tracks to build a partial reconstruction of a point cloud frame.

As another alternative, instead of grouping tracks either with a 'grpl' or a track group box, a base track (not represented) may be created to reference the sub-frame tracks corresponding to the same point cloud sequence. A base track has a specific track reference type in a TrackReferenceBox ('tref' box) indicating that the base track describes, in timing increasing order (following the declaration order in the 'tref' box), sub-frame tracks that when their data units are assembled together may lead to a bit-stream for the complete point cloud sequence. The assembling is done sample by sample. A base track may contain descriptive metadata, parameter set units or data units that are common to all sub-frame tracks. For example, the base track may contain sensor information like the acquisition rate, angular resolution, field of view, etc or a metadata structure dedicated to sub-frame configuration information. The base track may contain metadata structure dedicated to sub-frame configuration information. Each sub-frame track contains in its track or sample description, or both, the sub-frame description or additional timing information like for example acquisition or capture or rendering time, as the tracks 1120-1 to 1120-3 illustrated in FIG. 11, for example using a sample group providing sub-frame information like sample group description boxes 1135-1 to 1135-3.

Sub-Frame Description for Point Cloud Items

MPEG-I Part-18 defines G-PCC items and sub-sample item property under the 'meta' box of a media file. Similarly, to G-PCC tracks, a G-PCC item, corresponding to one Point Cloud frame may provide description of sub-frames within this image. The sub-sample item property may then be extended to support the subsample information box as described in reference to FIG. 7 defining new flags value(s) or reusing existing flags value. The sub-sample item property may then provide ATI for a G-PCC item. As well, when a G-PCC item is split into geometry item with zero or more attribute items, each geometry or attribute item may have sub-sample item property providing ATI. The geometry item may have a property dedicated to sub-frame configuration information (an item property either containing parameters that may be present in a metadata structure dedicated to sub-frame configuration information or this metadata structure itself). In a variant to ATI in a sub-sample item property, a specific sub-frame item property may be created and indicated in the media file. This specific sub-frame item property may contain ATI. Each sub-frame may also be stored and described in a media file as a separate sub-frame PCC item and associated with a G-PCC item representing the full frame via a specific item reference. A sub-frame G-PCC item may be identified by a specific item_type, for example 'gpsf' for G-PCC sub-frame item. A sub-frame G-PCC item may be associated with a specific sub-frame item property or with a sub-sample item property containing ATI. When sub-frame G-PCC items are linked to the full frame G-PCC item, only the full G-PCC item may contain a property dedicated to sub-frame configuration information. An new entity group may also reference all sub-frame G-PCC items that, when combined together, lead to the reconstruction of a full G-PCC item. This new entity group is indicated by a specific grouping_type 'sfig" for a sub-frame item group. A sub-frame G-PCC item may be linked to samples in a sub-frame G-PCC track through a 'stmi' sample group, for example when the G-PCC item is used as a thumbnail for the G-PCC track or as a cover image for the sub-frame G-PCC track. A metadata structure dedicated to sub-frame configuration information may be associated with G-PCC items to provide information on the sensor. When associated with items, metadata structure dedicated to sub-frame configuration information may be an item property, for example identified with 'sfcg' type for Sub-Frame Con-Figuration property. Alternatively, it may be merged (its parameters may be added) in the G-PCC configuration item property.

Generating Description Information During Data Compression

Figure 12:
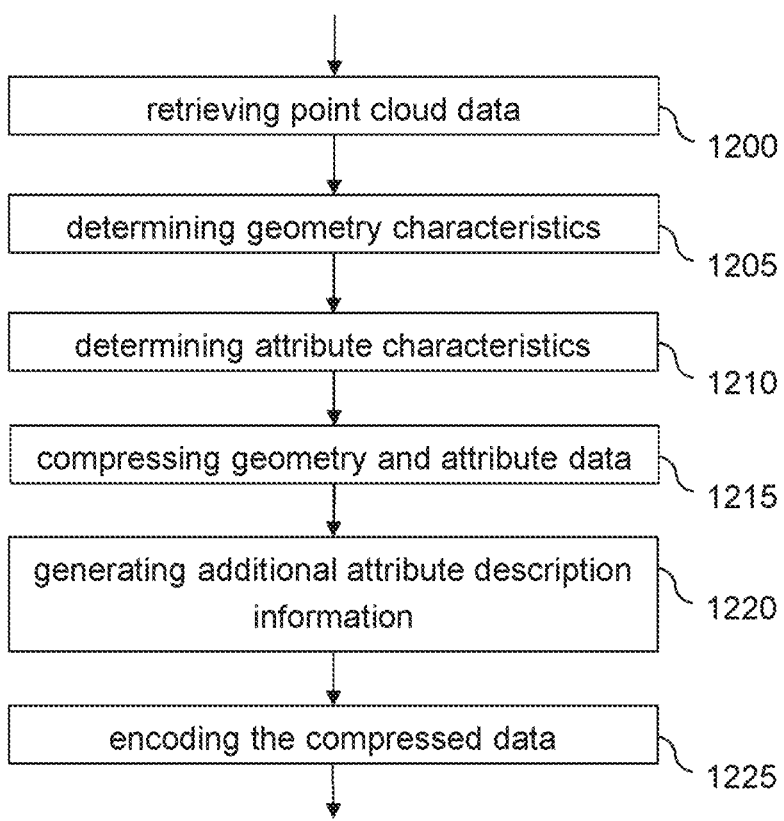
FIG. 12 illustrates an example of steps to be carried out during data compression for generating description information to be encapsulated and/or to be used during encapsulation.

FIG. 12 illustrates an example of steps to be carried out during data compression for generating description information to be encapsulated and/or to be used during encapsulation. For the sake of illustration, such steps may be carried out in compression module 106 in FIG. 1.

As illustrated, a first step is directed to retrieving point cloud data (step 1200), for example retrieving point cloud data 150 in FIG. 1. The point cloud data typically comprise geometry and attribute data. For example, a point cloud frame may comprise a set of 3D points (that correspond to geometry data), each of the 3D points being associated with attributes such as colour, transparency, reflectance, time-stamp, surface normal, and classification, referred to as the attribute data.

According to the example illustrated in FIG. 12, compression of the point cloud data begins by determining geometry characteristics of the point cloud frames (step 1205). In particular, the compression module (or encoder) carrying out the step illustrated in FIG. 12 determines the number of 3D points of the point cloud frames in the bit-stream and the bounding box that bounds the 3D points of the point cloud. According to some embodiments, one or several sets of 3D points that are within a predetermined 3D region of interest (ROI), represented by a bounding box, may also be determined during this step. These items of information may be provided in the Sequence Parameter Set or in the Tile Inventory data unit.

Next, attribute data characteristics of the point cloud frames are determined (step 1210). The determined attribute data characteristics may comprise the type of the attributes and also a set of parameters that describe the attribute value distributions, for each or some of the attributes. For example, the encoder may determine the range of the attribute values, for each type of attribute associated with 3D points of the point cloud frames, the cardinality of the set of different values (i.e. the number of different attribute values), and/or the set of attribute values associated with the 3D points of the point cloud frames. In a variant, the encoder may compute some statistics regarding the attribute values, for each ROI identified during step 1205, for each point cloud frame. As a result, the compression module (or encoder) may determine the variation of these statistics among the whole point cloud sequence.

Next, the geometry data and the attribute data are compressed (step 1215). For the sake of illustration, the compression algorithm may be based on MPEG-I Part 9 (G-PCC) that aims at compressing geometry data in Geometry Data Units (GDU) and attributes values in Attribute Data Units (ADU). It is noted here that G-PCC compression introduces coding dependencies between the ADUs and the GDUs to compress efficiently the attribute values associated with the 3D points. In addition, it is noted that the compression module (or encoder) may split the point cloud into portions that may correspond to the one or more ROIs identified in step 1205. In such a case, the compression module (or encoder) associates an identifier of the ROI with one or more compressed portions, the compressed portions being slices. The ROI may thus correspond to a group of slices (for example a tile).

According to some embodiments, the compression module (or encoder) generates description information for the attribute values (step 1220). The generated items of information describing the attribute values may comprise characteristics of the attribute values for one or more point cloud frames. The generated items of information may also contain statistics parameters or values as determined in steps 1205 and 1210. The generated items of information describing the attribute values are encoded as attribute value description information (AVDI) to allow the encapsulation module determining characteristics of the attribute values of the encoded bit-stream without requiring decoding the ADUs and thus, without requiring decoding the GDUs (decoding the ADUs may require to also decode the GDU due to the coding dependencies introduced by the compression module). Accordingly, determining characteristics such as additional timing information (e.g. step 325 in FIG. 3) in the encapsulation module requires less processing resources.

Next, the compressed data and the generated items of information describing the attribute values are encoded (step 1225). The compressed data are coded in a bit-stream for example using TLV encapsulation units. The encoded data contain the GDUs and ADUs and also optional Data Units (DU) that may provide AVDI.

As described hereafter, AVDI can be coded or signalled at different coding locations in the G-PCC bit-stream.

Signalling AVDI in a G-PCC Bit-Stream

According to some embodiments, AVDI is coded in an AVDI data structure coded within the Attribute Parameter Set (APS) DU. In particular, the AVDI data structure may be specified in the extension data of the APS. The extension mechanism of the APS relies on the aps_extension_present syntax element. When this syntax element is set to 1, it indicates the presence of data in the extension data of the APS. According to these embodiments, the syntax of the APS extension may be modified (as indicated in bold) as follows:

```
attribute_parameter_set {
    [...]
    aps_extension_present              # u(1)
    if( aps_extension_present ) {
        aps_avdi_present               # u(1)
        aps_extension_7bits            # u(7)
        if (aps_avdi_present)
            aps_avdi_extension( )
        if (aps_extension_7bits)
            while( more_data_in_data_unit( ) )
                aps_extension_data     # u(1)
    }
    byte_alignment( )
}
```

When aps_extension_present is equal to one, another syntax element (aps_avdi_present) indicates the presence of AVDI data described in the aps_avdi_extension( ) structure. The actual content of this structure contains statistics parameters as determined in step 1220. The parameter aps_avdi_present indicating the presence of AVDI in APS extension is followed by the aps_extension_7 bits syntax element. When aps_extension_7 bits is not equal to 0, it indicates the presence of further extension data in the APS. The characteristics of the attribute values encoded in the slices that reference an APS containing AVDI are represented by the content of the aps_avdi_extension( ) structure.

According to other embodiments, the AVDI data structure is coded in the Sequence Parameter Set (SPS) Data unit. Two alternative signalling methods can be used to signal the AVDI data: either in the SPS extension bytes or as an attribute property. In G-PCC, the SPS extension mechanism is similar to the APS i.e. it relies on the sps_extension_present syntax element. The syntax of the SPS is for example the following (new syntax elements are indicated in bold):

```
seq_parameter_set {
    [...]
    sps_extension_present              # u(1)
    if( sps_extension_present ) {
        sps_avdi_present               # u(1)
        sps_extension_7bits            # u(7)
        if (sps_avdi_present)
            sps_avdi_extension( )
        if (sps_extension_7bits)
            while( more_data_in_data_unit( ) )
                sps_extension_data     # u(1)
    }
    byte_alignment( )
}
```

The extension mechanism to indicate the AVDI data structure in extension data of the SPS is similar to the one for the APS. The sps_avdi_extension( ) structure contains the statistics parameters generated in step 1220 and is present when sps_avdi_present is set to 1. Otherwise, when sps_avdi_present is set to 0, no AVDI data are provided for the sequence. The sps_extension_7 bits is equivalent to the aps_extension_7 bits of the variant when the AVDI data structure is signalled in the APS.

The aim of the second alternative is to signal attribute value description information at the SPS level as an attribute property. In the current version of the G-PCC, the SPS defines one or more attribute properties that may be associated with each attribute signalled in the SPS. G-PCC defines predetermined types of attribute properties: ITU-T T.35 user defined, G-PCC user defined, IOS/IEC 23091-2 video code points, Attribute scale and offset value, Default attribute value. A specific range of attribute property type values (5 . . . 127) is reserved for future use by ISO/IEC and another range is reserved for attribute specific values (128 . . . 255). In a particular embodiment, AVDI is provided as a new type of attribute property. For example, AVDI is provided as a G-PCC user defined attribute property. In such a case, the attr_prop_oid attribute indicates that the content of the G-PCC user defined attribute property corresponds to AVDI data. For example, the object identifier (OID) "iso(1) standard(0)MPEG-I(23090)G-PCC(9)AVDI(0)" may be used. The attr_property_data(attrid, AttrPropDataLen) then contains the AVDI data. In another example, the AVDI attribute property has a reserved type value in the range (5 . . . 127) or in the range (128 . . . 255). The content of the AVDI data may depend on the type of attribute associated with AVDI attribute property as described hereafter.

The SPS Data Unit contains data that apply to the whole video sequence. As a result, the AVDI content is static for the whole video sequence, i.e. it is the same for all the point cloud frames of the video sequence. In particular cases, the characteristics of the attributes may change dynamically for one or more frames of the video sequence. Since G-PCC provides an overriding mechanism for properties of an attribute with the frame-specific attribute property (FSAP) data unit, this mechanism may be used, in a variant, to handle changes in the characteristics of the values. Accordingly, the FSAP data unit provides AVDI data as attribute properties that may override the attribute properties defined in the SPS (if any). For example, when AVDI describes attribute values for a Frame Index or Frame Number attribute, the AVDI data described in a FSAP data unit overrides the AVDI content of the SPS for this frame. It provides means for dynamic indication of the characteristics of attribute values of a sub-frame.

In yet another alternative, the AVDI data structure is provided in a dedicated data unit. G-PCC provides the User-data data unit to specify user data. In a first variant of this alternative, a User-data data unit conveys AVDI data when the user_data_oid of the User-data data unit is equal to a predetermined value. For instance, the predetermined value may be "iso(1)standard(0)MPEG-I(23090)G-PCC(9) AVDI(0)" to indicate the presence of the AVDI data in the user-data data unit. To determine the type of the attribute to which AVDI applies, the AVDI user-data data unit may further specify the attribute type and/or attribute index (the index of the attribute in the attribute list of the SPS) of the attribute for which AVDI applies. This attribute index can be provided as the first syntax element after the user_data_oid. As a result, it is possible to infer the type of the attribute by retrieving the type of the attribute having the same index in the SPS' coded attribute list. In a variant, the user_data_oid may indicate the type of attribute that is described by the AVDI user-data data unit. For instance, the user_data_oid may be equal to "iso(1)standard(0)MPEG-I(23090)G-PCC (9)AVDI(0)FrameIndex(3)". The last OID (object identifier) component (or arc), i.e. FrameIndex(3) part in the example above, corresponds to the value of the attr_label of the attribute as defined in the SPS. In a variant, the AVDI user-data data unit may be encapsulated in a specific TLV with a tlv_type equal to 10 for example.

For example, the syntax of the AVDI userdata_data_unit may be the following.

```
userdata_data_unit( ) {
    user_data_oid(v)
    if (user_data_oid == "iso(1)standard(0)MPEG-I(23090)G-
PCC(9)AVDI(0)") {
        avdi_cancel_flag # u(1)
        avdi_data_unit( )
        avdi_persistence_flag # u(1)
    }
    byte_alignement( )
}
``` wherein avdi_data_unit contains the parameters as generated in step 1220. For the sake of illustration, avdi_cancel_flag may be set to 1 to indicates that the data unit cancels the persistence of any previous AVDI data unit in decoding order and avdi_cancel_flag may be set to 0 to indicate the presence of AVDI, avdi_persistence_flag specifies the persistence of the AVDI. It may be set to 0 to specify that AVDI applies to the current point cloud frame only and it may be set to 1 to specify that AVDI applies to the current point cloud frame and persists for all the subsequent point cloud frames until the end of the bit-stream or the presence of AVDI in a subsequent point cloud frame.

Overriding Mechanism

The alternatives and variants to signal AVDI in the G-PCC bit-stream may be combined to provide different granularity levels of overriding or updating the AVDI content. For example, when defined at the SPS level, the AVDI data are valid for all the frames of the point cloud sequence. When the AVDI data structure is signalled in an FSAP or in a dedicated AVDI data unit, it can override the AVDI data defined in the SPS for a given point cloud frame. If a point cloud frame contains several slices, the AVDI data unit may allow overriding AVDI in FSAP for one or more slices of the point cloud frame.

Variant for the Content of AVDI

As described by reference to step 1220 in FIG. 12, AVDI may provide a generic representation of the attribute values regardless of the type of the attributes. For example, it may contain information directed to colour, transparency, reflectance, timestamp, surface normal, and classification attributes. The AVDI data described in the following embodiments may be the content of any of the avdi_data_unit( ), attr_property_data( ), sps_avdi_extension( ), and aps_avdi_extension( ) structures.

The AVDI data structure may provide syntax elements describing the range of attribute values and/or the list of attribute values coded in the ADUs of a point cloud frame. An example of syntax is the following:

```
generic_attribute_value_properties( ) {
    gap_attribute_index                #ue(v)  optional
    gap_components_minus1              #ue(v) optional
    attribute_range_information_present # u(1)
    if(attribute_range_information_present) {
        for (i=0; i < AttrDim; i++) {
            attribute_value_min[ i ] # u(16)
            attribute_value_max [ i ] # u(16)
        }
    }
    attribute_values_list_present          # u(1)
    if (attribute_values_list_present ) {
        attribute_values_list_cnt          # u(16)
```

-continued

```
        for (i=0; i< attribute_values_list_cnt; i++) {
            for (j=0; j < AttrDim; j++) {
                attribute_value_list[ i ] [ j ] # u(16)
            }
        }
    }
}
```

The semantics of the syntax elements may be the following:

gap_attribute_index identifies the coded attribute by its index into the active SPS attribute list. This syntax element may be coded using a fixed number of bits (e.g. 16 bits) or using 0-th order Exp-Golomb coding. This parameter is optional when AVDI is described as an attribute property of an SPS or FSAP data unit. Indeed, each attribute property is associated with one attribute and therefore its attribute index is already known and can be inferred, gap_components_minus1 plus 1 specifies the number of components of the identified attribute. This syntax element may be coded using a fixed number of bits (e.g. 16 bits) or using 0-th order Exp-Golomb coding. The presence of this syntax element is optional and can be inferred equal to attr_component_minus1[gap_attribute_index] from the active SPS, attribute_range_information_present when set to 1, attribute_range_information_present indicates the presence of ranges of values for each component of the attribute. When set to 1, attribute_value_min[i] and attribute_value_max[i] are present, when index i varies in the range from 0 to AttrDim which is equal to gap_components_minus1 plus 1, when set to 0, attribute_range_information_present indicates the absence of attribute value range for each component of the attribute. When set to 0, attribute_value_min[i] is inferred equal to 0 and attribute_value_max[i] is inferred equal to Exp2 (attr_bitdepth_minus1[gap_attribute_index]), when index i varies in the range from 0 to AttrDim, attribute_value_min[i] specifies the minimal value for the i-th component of the coded attribute with an index equal to gap_attribute_index. This syntax element may be coded using a fixed number of bits (e.g. 16 bits) or using 0-th order Exp-Golomb coding, attribute_value_max[i] specifies the maximal value for the i-th component of the coded attribute with an index equal to gap_attribute_index. This syntax element may be coded using a fixed number of bits (e.g. 16 bits) or using 0-th order Exp-Golomb coding, attribute_values_list_present when set to 1, attribute_values_list_present indicates the presence of a list of values used for the coded attribute with an index equal to gap_attribute_index, when set to 0, attribute_values_list_present indicates the absence of any list of value used for the coded attribute with an index equal to gap_attribute_index in active SPS attribute list, attribute_values_list_cnt specifies the number of different attribute values of the coded attribute with an index equal to gap_attribute_index in active SPS attribute list. This syntax element may be coded using a fixed number of bits (e.g. 16 bits) or using 0-th order Exp-Golomb coding, attribute_value_list[i][j] specifies the value of the j-th component for the i-th attribute value in the list of attribute values for the coded attribute with an index equal to gap_attribute_index in active SPS attribute list. This syntax element may be coded using a fixed number of bits (e.g. 16 bits) or using 0-th order Exp-Golomb coding, In a variant, the attribute_range_information_present is not present and inferred equal to 1 while attribute_values_list_present is absent and inferred equal to 0: the AVDI data structure may contain only information about the minimum and maximum values for the components of a coded attribute. In another variant, both syntax elements are absent and the attribute_range_information_present is equal to 0 while attribute_values_list_present is equal to 1: the AVDI data structure may contain only information about the list of used values for a coded attribute.

In an alternative, when the compression module needs to describe the characteristics of attribute values for more than one attribute, the generic_attribute_value_properties( ) structure can be specified for each attribute in the same avdi_data_unit( ), sps_avdi_extension( ), and aps_avdi_extension( ) structures. For example, the number of signalled AVDI data components may be coded at the beginning of a structure and each ADVI data component may be described inside a for-loop. For instance, the new syntax may be the following, wherein avdi_data_cnt indicates the number of generic_attribute_value_properties signalled in the AVDI data unit.

```
avdi_data_unit ( ) {
    avdi_data_cnt   # ue(v)
    for (j=0; j< avdi_data_cnt; j++) {
        generic_attribute_value_properties( )
    }
}
```

According to a particular embodiment, the compression module, for example compression module 106 in FIG. 1, may generate an AVDI attribute property in the SPS for the Frame Index attribute. From statistics or values, for example from the values determined in step 1205 and from information obtained during step 1210 in FIG. 12, the compression module may indicate the range of the frame index attribute values for the point cloud sequence. The encapsulation module may then determine, for example in step 325 in FIG. 3, the presence of additional timing information by parsing the AVDI attribute properties of the SPS. In addition, in step 330 in FIG. 3, it may determine the frame index values from the list of attribute values (attribute_value_list[i][j]) without having to decode the ADU. When the range of frame index values changes for a specific point cloud frame, the compression module may encode a FSAP data unit with the AVDI attribute properties containing the actual range of the sub-frame's frame index values for the point cloud frame.

In an alternative, the AVDI content may be specialized for the Frame Index attribute type in order to provide a more complete description of the frame index value characteristics for the point cloud frames. In such a case, the AVDI data for the frame index may describe only the maximum attribute value of the frame index and a second parameter indicating whether all the values in the range from 0 to this maximum value are present in the coded attribute of the point cloud frame. For the sake of illustration, the syntax of the frame_index_attribute_properties may be the following:

```
frame_index_attribute_properties( ) {
    frame_index_attribute_range            #u(16)
    frame_index_attribute_complete_range   #u(1)
}
``` wherein, frame_index_attribute_range indicates the values of frame index attributes in the point cloud frames in the range from 0 to frame_index_attribute_properties (inclusive). This syntax element may be coded using a fixed number of bits (e.g. 16 bits) or using 0-th order Exp-Golomb coding, frame_index_attribute_complete_range when set to 1, frame_index_attribute_complete_range indicates that the point cloud frames (except the last one of the sequence) contain one sub-frame for each value of frame index in the range from 0 to frame_index_attribute_range (inclusive), when set to 0, frame_index_attribute_complete_range indicates that the point cloud frames contain sub-frames with a frame index value in the range from 0 to frame_index_attribute_range (inclusive). The point cloud frames may or may not contain sub-frame for each value in this range.

As for generic attribute value properties, this structure can be defined in any of the AVDI data structures of the embodiments described herein above. The overriding mechanisms may also apply.

As a result, the encapsulation module can determine the number of sub-frames within the point cloud frames, without having to decode the attribute data units (ADUs). In the worst case, when frame_index_attribute_complete_range is equal to 0, the encapsulation may determine the maximum number of sub-frames within a point cloud frame.

In another alternative, the AVDI content is specialized for Frame Number attribute type. This specialized frame number AVDI may for instance describe the range of frame number attribute values in the point cloud frames. It may further indicate a maximum number of different sub-frames per point cloud frame. It may also indicate whether this number is the same for all the point cloud frames. Since the frame number attribute value is an index relative to the point cloud sequence (i.e. not relatively to the point cloud frame containing the sub-frames as the frame index), the order of the sub-frames may be different from the decoding order of the point cloud frames. For this reason, the specialized AVDI data structure may indicate whether the frame number attribute values are strictly increasing (or decreasing) between consecutive point cloud frames. In such a case, the encapsulation may indicate if buffering the decoded sub-frames is necessary to process (e.g. render) the sub-frames in a correct order. When the reordering is necessary (i.e. when the frame number attribute values are not strictly increasing between two consecutive point cloud frames), the specialized AVDI for Frame Number attribute may further indicate the minimal size of the reordering buffer (in number of decoded point cloud frames) that is necessary to reorder the sub-frame before processing (e.g. rendering). An encapsulation (or a de-encapsulation) module may use this item of information to determine the number of consecutive point cloud frames needed to decode one or more sub-frames with a particular range of frame number values. For example, the syntax of the specialized AVDI data structure may be represented by the frame_number_attribute_properties as follows:

```
frame_number_attribute_properties( ) {
    frame_number_range_min # u(16)
    frame_number_range_max # u(16)
    max_subframe_number_per_frame # u(16)
    constant_num_frame_number_attributes_per_frame # u(1)
    strictly_increasing_frame_number_attribute # u(1)
    strictly_decreasing_frame_number_attribute # u(1)
    reordering_buffer_size # u(16)
}
``` wherein
frame_number_range_min indicates the minimum value
for the frame number in a point cloud frame. This
syntax element may be coded using a fixed number of
bits (e.g. 16 bits) or using 0-th order Exp-Golomb
coding,
frame_number_range_max indicates the maximum value
for the frame number in the point cloud frames. This
syntax element may be coded using a fixed number of
bits (e.g. 16 bits) or using 0-th order Exp-Golomb
coding. The frame number values of the sub-frames
may be in the range from frame_number_range_min to
frame_number_range_max (inclusive),
max_subframe_number_per_frame indicates the maxi-
mum number of different Frame Number attribute
values per point cloud frame. This syntax element may
be coded using a fixed number of bits (e.g. 16 bits) or
using 0-th order Exp-Golomb coding,
constant_num_frame_number_attributes_per_frame
when set to 1, constant_num_frame_number_attrib-
utes_per_frame indicates that the number of different
Frame Number attribute values is the same for all the
point cloud frames and is equal to max_subfra-
me_number_per_frame,
when set to 0, constant_num_frame_number_attrib-
utes_per_frame indicates that the number of different
Frame Number attribute values may or may not be
the same for all the point cloud frames and is inferior
or equal to max_subframe_number_per_frame,
strictly_increasing_frame_number_attribute
when set to 1, strictly_increasing_frame_number_at-
tribute indicates that the Frame Number attribute
values are strictly increasing between two consecu-
tive point cloud frames,
when set to 0 strictly_increasing_frame_number_at-
tribute indicates that the Frame Number attribute
values may or may not be strictly increasing between
two consecutive point cloud frames
strictly_decreasing_frame_number_attribute
when set to 1, strictly_decreasing_frame_number_at-
tribute indicates that the Frame Number attribute
values are strictly decreasing between two consecu-
tive point cloud frames,
when set to 0, strictly_decreasing_frame_number_at-
tribute indicates that the Frame Number attribute
values may or may not be strictly decreasing
between two consecutive point cloud frames,
reordering_buffer_size indicates the minimal size of the
buffer, expressed in a number of decoded point cloud
frames, that is necessary to reorder the decoded sub-
frames in a correct processing (e.g. rendering) order.
Possibly, the frame_number_attribute_properties may
contain only a subset of these parameters.
In another variant, the Frame Number AVDI may explic-
itly signal the list of the Frame Number attribute values
present in the point cloud frames. Such a kind of signalling
requires that Frame Number AVDI is signalled in a container that can be specified differently for each point cloud frame
of the sequence. For this reason, this variant may apply when
the AVDI data structure is present in an attribute property of
an FSAP, in an APS, or in AVDI data unit. For the sake of
illustration, the syntax of the frame AVDI may be the
following:

```
frame_number_values_properties( ) {
    subframe_number                        # u(16)
    for (i=0; i< subframe_number; i++)
        frame_number_value[ i ]            # u(16)
}
``` wherein,
subframe_number indicates the number of different
Frame Number attribute values present in a point cloud
frame and
frame_number_value[i] is the i-th different frame number
attribute value present in a point cloud frame.
The attributes associated with a 3D point may correspond
to timed information. For example, Frame Number and
Frame Index are indicative of different capture time of the
3D points. The 3D points may also be associated with a
Timestamp attribute, for example when a spinning LiDAR
captures the point cloud frames. For this kind of timed
attribute values, the AVDI data structure may be used to
associate a timed value with attribute values. An encapsu-
lation module may then use this timing information to
generate the composition time offsets of the samples or
sub-samples of the coded point cloud sequence. In this
alternative, AVDI may include a generic timing description
information that associates a time offset with the 3D points
that have a particular attribute value. For example, the AVDI
syntax of the generic AVDI may be the following:

```
generic_attribute_value_properties( ) {
    gap_attribute_index                    #ue(v)  optional
    gap_components_minus1                  #ue(v) optional
    attribute_range_information_present # u(1)
    if(attribute_range_information_present) {
        for (i=0; i < AttrDim; i++) {
            attribute_value_min[ i ] # u(16)
            attribute_value_max [ i ] # u(16)
        }
    }
    attribute_values_list_present  # u(1)
    if (attribute_values_list_present ) {
        attribute_values_list_cnt
        for (i=0; i< attribute_values_list_cnt; i++) {
            for (j=0; j < AttrDim; j++) {
                attribute_value_list[ i ] [ j ] # u(16)
            }
        }
    }
    timing_information_present             # u(1)
    if ( timing_information_present ) {
        num_time_units_in_ticks            # u(32)
        time_scale                         # u(32)
        time_offset_present # u(1)
        if ( time_offset_present ) {
            num_time_offset_minus1         # u(16)
            for (i=0; i<= num_time_offset_minus1) {
                attribute_value_list_index[ i ] # u(16)
                time_offset[ i ] # u(16)
            }
        }
    }
}
``` wherein,
timing_information_present indicates whether timing
information is present in the AVDI data when set to 1, timing_information_present indicates that timing information is present in the generic_attribute_value_properties and when set to 0, timing_information_present indicates that no timing information is present, num_time_units_in_ticks indicates the number of time units of a clock operating at the frequency equal to the time_scale value (expressed in Hz) between two increments of the time offset, and time_scale indicates the frequency (expressed in Hz) of the reference clock for timed values.

In practice, these first syntax elements make it possible to indicate a reference time unit for the timing information provided in by the attribute value. Using these syntax elements, a time unit is defined as a duration of num_time_units_in_ticks divided by the time_scale seconds. An increment of 1 of the value of the attribute with which the AVDI is associated corresponds to a duration of one time unit. For instance, when the attribute associated with the AVDI data is a Timestamp attribute, they allow indicating the reference time unit used for the Timestamp attribute value. As a result, when the AVDI data structure provides the range of the attribute values and the timing information, the encapsulation module may determine the duration of a point cloud frame and also the initial (or average) capture time of the 3D points in the frames. In another example, when the type of the attribute is Frame Index or a Frame Number, providing the timing information in AVDI allows determining the time offset between two consecutive sub-frames. An encapsulation module may then determine the composition time offset for the different sub-frames in a sample, without the need for decoding the ADUs. In yet another example, the encoder may signal a timestamp value in a default ADU for a point cloud. In such a case, AVDI may signal only timing information (e.g. the attribute value range and attribute value list are not present). The timing information then indicates the time units between two values of the attribute value specified in each default ADU (for the Timestamp attribute) of the sequence. Finally, it allows specifying a composition time offset value for each point cloud of the frame.

In another variant, the time offset between two consecutive values of attribute is not constant. This may happen, for example, when each point cloud frame is the fusion of frames captured from several LiDARs. Each LiDAR may use its own clock (that may not be synchronized) and may generate Timestamp attribute values using different time reference and time clock. Each Timestamp attribute is associated with timing information in AVDI data to specify the time clock parameters of each LiDAR. When combining the point clouds frames of the different LiDAR in a single frame, the encoder may generate an attribute that represents an identifier of LiDAR that captures the 3D point. The encoder may then associate timing information in AVDI data for this LiDAR Identifier attribute (it can also be a frame index attribute i.e. one sub-frame for each LiDAR in the point cloud frame). The AVDI timing information would indicate a common time reference. The timing information then associates an attribute value (i.e. a value of a LiDAR identifier) with a time offset in the common time reference. As a result, the encapsulation module can associate precise time information with sub-samples present in the sample.

In the syntax of the example given above, the presence of the association between a time offset and a value of an attribute is indicated by the value of time_offset_present. When time_offset_present is equal to 1, it indicates the presence of time offsets for the attribute value of the coded attribute in the SPS list at index gap_attribute_index. On the contrary, when Time_offset_present is equal to 0, it indicates the absence of time offset for the attribute value of the coded attribute in the SPS list at index gap_attribute_index.

When the time offsets syntax elements are present, num_time_offset_minus1 plus 1 indicates the number of time offsets values. This syntax element may be coded using a fixed number of bits (e.g. 16 bits) or using 0-th order Exp-Golomb coding. attribute_value_list_index[i] indicates the index of the i-th attribute value associated with a time offset in the list of attribute values (attribute_value_list). This syntax element may be coded using a fixed number of bits (e.g. 16 bits) or using 0-th order Exp-Golomb coding. time_offset[i] is a positive integer value that indicates the time offset of the i-th attribute value associated with a time offset. This syntax element may be coded using a fixed number of bits (e.g. 16 bits) or using 0-th order Exp-Golomb coding. In a variant, instead of referring to the list of attribute values coded with the attribute_value_list syntax element, the timing information of the AVDI data specify the component values of the attribute values associated with a time offset. In a variant, the attribute_value_list_index[i] is not present and a single time offset value is signalled corresponding to the time offset expressed in term of time units between two consecutive values of the attribute. In a variant, the number of components is inferred equal to 1 for the attribute associated with AVDI having time_offset_present equal to 1. In such a case, the number of components for the attribute is not signalled in the AVDI and is inferred equal to 1. As a result, the attribute value that is associated with time offset equal to 0 (if any) has the earliest timing. The encapsulation module can determine the timestamp value of a point in a reference time clock.

In a variant of some of the previous embodiments, the point cloud sequence may be coded in such a way that it makes it possible to extract or decode only a portion (e.g. a ROI) of the point cloud frames. In such a case, it is advantageous for the encapsulation module to provide AVDI data per portion of the point cloud data. There are various alternatives to perform such signalling. The AVDI data structure may include a signalling loop that iterates on each predetermined portion or ROI of the point cloud. Within each loop, AVDI associates the AVDI data with an identifier of the portion. For the sake of illustration and considering G-PCC, such identifiers may correspond to values of slice_id or slice_tag. In a variant, the AVDI structure includes a list of portion identifiers for which it applies. In yet another variant, the AVDI data unit applies only to the first ADU that follows in each slice of the point cloud frame. The AVDI data unit is therefore valid only for a single slice and a single attribute.

File Format Variants for Signalling Timing Information

In some embodiments, the encapsulation module may signal additional timing information allowing determining the composition timestamp offset of the sub-frames. Indeed, the sub-frames share the same decoding time which is equal to the decoding time of the sample (indicated in the 'stts' box of the sample description or in track fragment description for fragmented files). However, the sub-frames may have a composition time that is different from the composition time of the sample (indicated in the 'ctts' box of the sample description or in track fragment description for fragmented files). In such a case, the additional timing information may signal a time offset to make it possible to determine the composition timestamp of each sub-frame. In a particular embodiment, the time offset for a sub-frame is relative to the composition timestamp of the sample. In a variant, the time offset is relative to the media file (in other words, it may be considered relative to the first sample of the point cloud sequence). Still in a variant, the timing information may also signal the duration of the sub-frames as an optional parameter.

For instance, the additional timing information indicating the time offset for each sub-frame may be described in a new metadata structure as follows:

```
aligned(8) class SubframeCompositionOffset( ) {
    unsigned int(32) entry_count;
    for (i=0; i < entry_count; i++) {
        unsigned int(32) subframe_count;
        signed int(32) subframe_time_offset;
        unsigned int(32) subframe_duration; // optional
    }
}
``` wherein, entry_count is an integer that gives the number of entries in the following table, subframe_count is an integer that counts the number of consecutive sub-frames that have the given offset and optionally the given duration, subframe_time_offset is an integer that gives the offset between Composition Timestamp CT(n) of the n-th sample and the Composition Timestamp CTs of the i-th subframe such that CTs[i]=CT[n]+subframe_time_offset [n], with n equal to the current sample index for which SubframeCompositionOffset applies, and subframe_duration, when present, is an unsigned integer indicating the duration of the sub-frame.

In a variant, the subframe_time_offset is an integer that gives the offset between the Composition Timestamp CTs of the i-th subframe and the Decoding Timestamp DT(n) of the n-th sample and such that CTs[i]=DT[n]+ subframe_time_offset [n].

The subframecompositionOffset may be stored in a 'subs' box as an extension of the codec_specific_parameters. The SubframeCompositionOffset may be stored in a sample entry of a G-PCC track, for example as an optional box at the end of the sample entry. The subframecompositionOffset may be stored in a DecoderConfigurationRecord, within a 'gpcC' box.

In a variant, when the time offset between the sub-frames is constant, the 'subs' box may indicate the time offset for each sub-frame in a SubframeCompositionOffset structure. For instance, the 'subs' box may indicate the time offset for each sub-frame in a SubframeCompositionOffset structure as follows:

```
aligned(8) class SubframeCompositionoffset( ) {
    unsigned int(32) subframe_count;
    unsigned int(32) subframe_time_offset_delta;
    unsigned int(32) subframe_duration; // optional
}
``` wherein, subframe_count is an unsigned integer that counts the number of sub-frames in a frame, subframe_time_offset_delta is an unsigned integer that gives the difference between Composition Timestamps of two successive sub-frames. The Composition Timestamp CTs of the i-th subframe may be computed as CTs[i]=CT[n]+ subframe_time_offset_delta*i, and subframe_duration, when present, is an unsigned integer indicating the duration of the sub-frame.

In this variant, the subframe_time_offset_delta may be omitted and be computed from the duration of the frame and the number of sub-frame inside the frame.

The two variants may be combined in a single structure using a flag parameter.

The SubframeCompositionOffset may be defined in the 'subs' box when the composition offsets may change at each sample. In a variant, the SubframeCompositionOffset is provided in a sample group when the offsets are valid for one or more samples of the sequence. In yet another variant, the SubframeCompositionOffset is described in a sample entry when the offsets are the same for all the samples of the sequence. In yet another variant, the SubframeCompositionOffset may be defined in new box and stored in the sample table box container. In yet another variant, the SubframeCompositionOffset is defined in a metadata track.

The sub-frame configuration information may be dedicated to sub-frame timing information. One example of use is the case of combined frames, as illustrated with reference 950 in FIG. 9: several frames (e.g., frame 1 and frame 2), captured by a 3D sensor, are aggregated into a combined frame for (geometry) compression efficiency. The compression may be done with MPEG-I Part-9 to produce a G-PCC bit-stream. After aggregation, the frames that are aggregated are then denoted "sub-frames" or "G-PCC sub-frames" and the combined frame is denoted "G-PCC frame" or "frame". The resulting bit-stream may then contain less encoded G-PCC frames than captured frames. The sub-frames may be indicated in the G-PCC bit-stream using frame index or frame number attributes. The encoder, when using a frame number attribute, may change the order between captured frames (denoted sub-frames) before aggregating them into combined frames (denoted frame or G-PCC frame). For example, a sub-frame captured at time 40 ms may be encoded in a first frame with decoding time t while a sub-frame captured earlier may be encoded in a second frame with decoding time t+delta (delta being a positive time period). When encapsulating a G-PCC bit-stream with sub-frames into G-PCC tracks according to MPEG-I Part-18 (e.g., document w20565, dated October 2021), the resulting tracks do not provide timing information allowing the reconstruction of captured frames in their original order. Indeed, the composition time or decoding time of the samples cannot help since it is associated with encoded G-PCC frames and not with the captured frames. In order to help media readers or players to compute the composition timestamp of the sub-frames corresponding to their capture time, it is proposed to add sub-frame timing information as part of sub-frame configuration information in G-PCC tracks. Since MPEG-I Part-18 defines several kinds of track, it is described hereafter in which tracks it is recommended to add the sub-frame timing information. Preferably, it is embedded in the media file as a sample group because it allows handling both static or dynamic configurations, through appropriate flags or version values in the SampleGroupDescriptionBox ('sgpd'). A sub-frame configuration timing sample group may provide the sub-frame timing information, e.g. the timing information on G-PCC sub-frames. The sub-frame timing information is indicated by encapsulation module as a time offset relative to the composition time of the sample containing the G-PCC sub-frame, e.g., as a time offset to the composition time of the sample containing the sub-frame or as a time offset to the previous sub-frame in the same sample. As stated in ISO/IEC 14496-12, when a track containing this sample group has no CompositionOffsetBox ('ctts' box), the composition time of a sample corresponds to the decoding time of this sample. The presentation or composition time for G-PCC sub-frames contained in a G-PCC sample is derived after the presentation or composition time of the containing G-PCC sample is resolved.

When a G-PCC bit-stream contains sub-frames, the corresponding G-PCC track(s) should contain the sub-frame timing sample group so that players can access precise timing information (e.g., corresponding to a capture time by a 3D sensor).

Sub-Frame Timing in Single Track.

A sub-frame configuration structure, in particular the sub-frame timing information sample group ('sfcf', or any dedicated 4 CC), may be present in the description of a single G-PCC track encapsulating a G-PCC bit-stream containing sub-frames. Single G-PCC track may be indicated with sample entry types 'gpe1' or 'gpeg'.

Sub-Frame Timing in Multiple Tracks as Geometry and Attribute Tracks.

A sub-frame configuration structure, in particular the sub-frame timing information sample group ('sfcf', or any dedicated 4 CC), may be present in 'gpc1' or 'gpcg' tracks carrying the geometry component and should not be present in 'gpc1' or 'gpcg' tracks carrying attribute components. Indeed, tracks belonging to the same G-PCC sequence are time-aligned, so there is no need in duplicating the sub-frame timing information sample group ('sfcf') in each component track (geometry or attribute track). Having sub-frame timing information in the geometry track guarantees that readers will not miss this information since the geometry track is an entry point in the media file (i.e. the track has its flags value "track_in_movie" that is set).

In a variant, the track carrying the sub-frame timing information sample group ('sfcf', or any dedicated 4 CC) is no more carried in the geometry track, but rather in the attribute track corresponding to a frame index attribute or the attribute track corresponding to a frame number attribute (or any attribute track carrying sub-frame information). These tracks can be 'gpc1' or 'gpcg' tracks having a gpcc_type indicating attribute data in their GPCCComponentInfoBox with an attr_type equal to 3 or 4). In this variant, the sub-frame configuration structure (e.g. the 'sfcf' sample group) may not be present in other component tracks. This allows readers that are not interested in sub-frame information to discard sub-frame related information by simply discarding this attribute track. In other words, readers that are not interested in sub-frame information can simply ignore this attribute track. This still avoids duplicating the sub-frame timing information across all G-PCC component tracks.

Sub-Frame Timing in Tile Tracks (Each Tile Track Carrying all the Components)

As for multiple component tracks, the sub-frame timing information sample group ('sfcf', or any dedicated 4 CC) could be carried by the track that corresponds to an entry point, i.e. the tile base track with sample entry type 'gpeb'. However, according to MPEG-I Part-18 (as specified in w20565, October 2021), the samples between a tile base track and its referenced tile tracks may not be time-aligned. For instance, the number of samples of a tile base track does not necessarily match 1:1 with the number of samples in its referenced tile tracks. Then, it is not possible to declare sub-frame timing information in the tile base track, because not all the samples may be present in this track.

According to a first embodiment, a tile base track is specified so that it becomes time-aligned with the tile tracks it references. For example, an encapsulation module generates as many samples in the tile base track as there are samples in the tile tracks. Some samples may be marked as empty samples when they do not contain any data. This can be made by setting the sample size to zero in the sample description. Moreover, to allow random access and to align random access samples (or sync samples) across the tile base track and the referenced tile tracks, some samples of the tile base track may be not empty and contain duplicated G-PCC units required to decode from this random access or sync sample. The tile base track may also contain a sample group indicating random access and there is no need to signal random access or sync samples in each tile track. Accordingly, the sub-frame timing information sample group can be carried in the tile base track, avoiding its duplication in each tile track. Moreover, the reconstruction of a G-PCC bit-stream from a tile base track is easier because it is no more needed to identify the sample of the tile base track to use when starting rendering the file from a random access or sync sample: there is always a sample in the tile base track that has the same decoding time as the sample in a tile track.

According to a second embodiment, the sub-frame timing information is carried in each tile track (e.g. with 'gpt1' sample entry type) and not in the tile base track (e.g. with 'gpeb' sample entry type). While this may introduce a bit of redundancy when the tiles contain the same sub-frames, this embodiment has the advantage of supporting tiling configurations in which the number of sub-frames would be different from one tile to another (for example when sub-frames are used with rotating LIDAR as illustrated on and described in reference to FIG. 2). In this second embodiment, it is safer that a same frame index or frame number in different tile tracks lead to the same sub-frame time offset for the given frame index or frame number in these tile tracks, so that players or readers unambiguously determine the timing of points from different tiles associated with a given sub-frame (e.g. point with a same frame index or frame number attribute value).

Sub-Frame Timing in Tile Tracks with Components Split into Different Tracks

MPEG-I Part-18 allows encapsulating G-PCC bit-stream as a tile base track (with 'gpcb' sample entry type) referencing tile tracks that are further split in component (geometry and attribute) tracks ('gpt1'). For such encapsulation, the sub-frame timing information sample group ('sfcf', or any dedicated 4 CC) could be carried in different tracks.

According to a first embodiment, if the tile base track ('gpcb') is defined with empty samples and synchronized random access (as described in the first embodiment for sub-frame timing in tile tracks) in order to be time-aligned with the tile tracks, the sub-frame timing information is carried in this tile base track and not in any tile track. While this avoids some duplication, it does not allow exact description of sub-frame timing per tile, especially when there is not the same number of sub-frames from one tile to another. It is convenient when the tiles contain the same number of sub-frames.

According to a second embodiment, avoiding the above limitation, the sub-frame timing information is carried in each tile track carrying the geometry component. This can be a good trade off to support constant or variable number of sub-frames across tiles and to mutualize the declaration of sub-frame timing information in a single component track. According to this embodiment, the tile base track ('gpcb') and the tile tracks carrying attribute components should not contain the sub-frame timing information.

According to a third embodiment, still supporting constant or variable number of sub-frames across tiles, the sub-frame timing information is carried in each tile track ('gpt1') carrying attribute information corresponding to a frame index attribute or to a frame number attribute (or in any tile track carrying sub-frame information). According to this third embodiment, the tile base track ('gpcb') and the tracks carrying a geometry component or an attribute component not related to a sub-frame should not contain the sub-frame timing information to avoid redundancy. This allows readers or parsers not interested in sub-frame information to discard sub-frame descriptions by not selecting a tile track carrying an attribute component related to a sub-frame.

The second or third embodiment above is preferable when the number of samples of a tile base track does not necessarily match 1:1 with the number of samples of its referenced tile tracks, but considering that geometry track and its attribute tracks remain time-aligned.

An amendment to MPEG-I Part-18 is considering support of temporal scalability by defining temporal level tracks or temporal level tile tracks. Samples in a temporal level track or temporal level tile track may contain sub-frames. Then, the description of the sub-frame timing can be present in these tracks (for example as a sub-frame timing information sample group, indicated by 'sfcf' or any dedicated 4 CC). Since the sub-frame timing is computed relatively to sample composition time, the sub-frame timing can be specified in each temporal level track or temporal level tile track independently or only in some of them following the same rules or constraints as above for the different embodiments depending on the different types of encapsulations and track types (single track or multiple component tracks or multiple tile tracks or multiple tile tracks further split in component tracks).

Representation of Sub-Frame Timing Information

More variants for signalling timing information, especially sub-frame timing information, may be considered, depending on whether:

the declaration of sub-frame time offsets assumes an implicit order of sub-frames or not, the sub-frame time offset is declared as a function of the sample composition time or as a function of the previous sub-frame in the same sample, the sub-frame timing information distinguishes cases between sub-frames with constant duration and sub-frames with varying durations, and/or the sub-frame time offsets are expressed as unsigned (positive) integers or as signed (positive or negative) integers.

On implicit or explicit order of sub-frames in the sub-frame timing information, when the sub-frame timing information describes the timing of sub-frames present in the samples, an implicit order can be used. For example, in entries of a sample group description for sub-frame timing information, the items, or parameters, of sub-frame timing information making it possible to compute the composition time of a sub-frame (e.g., time offsets, time durations, or time offset deltas) are implicitly ordered in the order of sub-frames present in the samples, mapped to this sample group description entry, with increasing frame index or frame number attribute values. In a variant, the implicit order may follow a decreasing frame index or frame number attribute values. This requires the encapsulation module to obtain the information of the number of sub-frames per sample and their frame index or frame number values. This can be provided through application-specific means or by decoding the G-PCC bit-stream before encapsulation. The number of sub-frames per sample may be parameterized in the application or as input of a G-PCC encoder or from ATI inserted in the bit-stream.

In a variant, providing the explicit order of sub-frames, the timing information describing each sub-frame may comprise an identifier of the sub-frame, e.g. the frame index or frame number attribute value.

In another variant, when a maximum number of sub-frames is defined, it may be preferable to use an explicit index in the sample group description entry, for example by encoding with the time offset value, the corresponding frame index or frame number value, that may be called for example subframe_order:

```
unsigned int(32)    subframe_count; // maximum number of sub-
frames
for (i=0; i < subframe_count; i++) {
    signed int(32) subframe_time_offset[i];
    unsigned int(32) subframe_order[i];
}
```

In this case, the loop runs over this maximum number of sub-frames and a specific time_offset value may be used (e.g., 0xFFFFFFFF) to indicate that a sub-frame is not present in samples mapped to this sample group description entry.

Indicating an explicit index allows readers or parsers to directly associate a time offset with a given sub-frame index or sub-frame number before decoding any data unit. In the case of implicit ordering, parsers or readers, when parsing the sub-frame timing information, may only associate the timing information (e.g., a time offset, time duration, or time offset delta) with the first sub-frame, the second sub-frame, etc., but the actual mapping between a frame index or frame number and its corresponding timing information, particularly when sub-frames are reordered in a sample or across samples, may only be determined when decoding a sample, in particular the geometry and frame_index or frame_number attribute data.

Alternatively to the specific value, a flag indicating presence of a given sub-frame may be used and the sub-frame timing information (e.g., time_offset, etc.) is provided only when this flag is set to true. When it is set to false, no timing for the corresponding sub-frame is indicated, as illustrated with the following syntax:

```
unsigned int(32)    subframe_count; // maximum number of sub-
frames
for (i=0; i < subframe_count; i++) {
    unsigned int(1) subframe_ispresent[i];
    unsigned int (7) reserved_bits;
    if (subframe_ispresent[i] {
    signed int(32) subframe_time_offset[i];
}
```

With this alternative for sub-frame timing information, parsers or readers may directly associate time offsets and compute composition times for the sub-frames of samples mapped to this sample group description entry before decoding the data units.

Alternatively, when a maximum number of sub-frames is defined and known by the encapsulation module, two loops may be described: a first one indicating the sub-frames that are not present in the samples mapped to the sample group description entry and for which no timing information is provided. A second loop provides time offsets for the present sub-frames with an implicit order of sub-frames (e.g., increasing frame index or frame number values).

```
unsigned int(32) nb_present_subframes;
unsigned int(32) nb_absent_subframes;
unsigned int(32) subframe_order[nb_absent_subframes]; // first
loop
for (int i=0; i<nb_present_subframes; i++) { // second loop
    signed int(32) subframe_time_offset[i];
}
``` where,
- nb_present_subframes indicates the number of sub-frames encoded or present in samples mapped to this sample group description entry,
- nb_absent_subframes indicates the number of sub-frames that are not encoded in samples mapped to this sample group description entry. The sum of nb_absent_subframes and nb_present_subframes should be equal to the maximum number of sub-frames provided to the encapsulation module, and
- subframe_order[nb_absent_subframes] loops over absent sub-frames and provides, for each absent sub-frame, the value of its frame index or frame number. This may be represented by an array of nb_absent_subframes entries.

The second loop then provides the time offsets for the present sub-frames with the subframe_time_offset parameter. The time offsets follow an implicit order of increasing frame index or frame number.

In this alternative, there is no need to indicate a sub-frame index or number with the time offset because it is determined from sub-frame index or number values that are not listed in the first loop.

The two approaches (implicit or explicit order) may be combined in the sample group description entries providing sub-frame timing information by using a parameter or a flag that indicates whether implicit order is used or explicit order is used. When such parameter is present, the variant with two loops can be used, the presence of the first loop being conditioned to the parameter or flag indicating that the order is explicit, as illustrated with the syntax hereafter:

```
unsigned int(32)  subframe_count; // maximum number of sub-
frames unsigned int(1) use_explicit_index;
unsigned int(7) reserved;
if (use_explicit_index) {
    unsigned int(32) nb_absent_subframes;
    unsigned int(32) subframe_order[nb_absent_subframes]; //
first loop
} else {
    nb_absent_subframes = 0;
}
for (int i=0; i< (subframe_count - nb_absent_subframes); i++)
{ // second loop
    signed int(32) subframe_time_offset[i];
}
``` where the second loop provides time offsets in an increasing order of frame_index or frame_number values for the sub-frames present in the samples mapped to this sample group description entry.

Representation of Sub-Frame Time Offsets

The sub-frame timing information of a sub-frame may be given by a time offset relative to the composition time of the sample containing this sub-frame or relative to a previous sub-frame in the same sample. In the latter case, time offsets may be smaller and could be encoded on a smaller number of bits (by default 32 bits could be used, as for sample timing). The latter case also allows a more compact description when the time offsets between sub-frames are constant.

In a variant, the representation of sub-frame time offsets may use either a time offset as a delta between sub-frames or time offset as an offset to the composition time of the sample containing the sub-frame, depending for example on whether all the sub-frames have a same time offset delta or not, or on whether they have the same duration and do not need any reordering. This can be described as follows:

```
Group Types:          'sfcf'
Container:            Sample Group Description Box ('sgpd')
Mandatory:           No
Quantity:            Zero or more
class SubFrameTimingGroupEntry ( ) extends
VolumetricVisualSampleGroupEntry ('sfcf') {
    unsigned int (1)   constant_time_offset_delta;
    unsigned int (7)   reserved;
    unsigned int(32)   subframe_count;
    if (constant_time_offset_delta == 1) {
        unsigned int(32) subframe_time_offset_delta;
    }
    else {
        for (i=0; i < subframe_count; i++) {
            signed int(32) subframe_time_offset[i];
        }
    }
}
``` where
- constant_time_offset_delta indicates whether all G-PCC sub-frames contained in the G-PCC samples mapped to this sample group description entry have a constant time offset delta with the previous G-PCC sub-frame in the increasing order of their frame index or frame number attribute values. For the sake of illustration, value 1 indicates that the time offset delta is constant and value 0 indicates that the time offset delta may not be constant. When the difference between sub-frame time offsets are constant, or constant_time_offset_delta equals 1, for a group of G-PCC samples, the time offset of the i-th G-PCC sub-frame in a sample is equal to subframe_time_offset_delta*i and the composition timestamp $CTS[i]$ of the i-th G-PCC sub-frame in a sample is computed as $CTS[i]=CT+$ subframe_time_offset_delta*i, where CT is the composition time of the sample containing the G-PCC sub-frame and where i is varying from 0 to subframe_count−1 included,
- subframe_count is an unsigned integer that indicates the number of G-PCC sub-frames present in G-PCC samples mapped to this sample group description entry. The value 0 is reserved. Optionally, the test on constant_time_offset_delta may also be directed to test whether subframe_count is greater than one to indicate the presence or not of a subframe_time_offset_delta parameter. Indeed, if there is only one sub-frame in the samples mapped to this sample group description entry, it may be preferable to provide the time offset through the subframe_time_offset parameter, unless the if the composition time of the sub-frame is the same as the composition of the sample (the time_offset for the sub-frame would then be equal to 0),
- subframe_time_offset_delta may be represented by an unsigned integer and indicates the constant time offset delta between two consecutive G-PCC sub-frames present in the G-PCC samples mapped to this sample group description entry. The unit for subframe_time_offset_delta may be in timescale of the media (e.g. timescale from the track header or movie header).

Alternatively, it may be expressed in microseconds, nanoseconds, or any other timing unit.

Finally, the subframe_time_offset[i] indicates the time offset of the i-th G-PCC sub-frame present in the G-PCC samples mapped to this sample group description entry. It may be represented by a signed integer and expressed as units of the timescale of the media or alternatively directly in microseconds, nanoseconds, or any other timing unit. This time offset is relative to the composition timestamp of the sample containing the sub-frame. When the difference between sub-frame time offsets are not constant, or constant_time_offset_delta equals 0, for a group of G-PCC samples, the time offset of the i-th G-PCC sub-frame in a sample is equal to subframe_time_offset[i] and the composition timestamp CTS[i] of the i-th G-PCC sub-frame in a sample is computed as CTS[i]=CT+subframe_time_offset [i], where CT is the composition time of the sample containing the sub-frame and where i is varying from 0 to subframe_count−1 included.

Using signed integer allows reordering sub-frames, e.g., across samples. In a variant, the subframe_time_offset[i] may be encoded as a time difference between two consecutive sub-frames present in the G-PCC samples mapped to this sample group description entry. In such a case, the time offset for the first sub-frame in the sample may not be encoded and is assumed to be 0. Then, the composition time of the first sub-frame corresponds to the sample composition time. In such a case, the loop on sub-frames may start from 1 and not from 0 (or start from 0 but until (subframe_count−1)). The above distinction between constant or not constant time offset is optional and only the loop on sub-frames may be present in the sub-frame configuration structure providing sub-frame timing information.

The time offsets in the sub-frame timing information may be expressed as unsigned (positive) integers or as signed (positive or negative) integers. For example, the composition time for a sample may be set equal to the composition time of the earliest sub-frame in this sample. Then, the time offsets of all sub-frames in the sample may be always positive and can be represented by unsigned integers. By doing so, there is no need to provide the time offset for the first sub-frame of a sample and the loop on time offsets can start from second sub-frame in the sample. Conversely, when the composition time for the earliest sub-frame of a sample and the composition time for this sample are not equal (or not aligned), the time offsets for the sub-frames should be expressed as signed integers. This allows sub-frame reordering across samples, for example it allows indicating that a sub-frame in a sample should actually be rendered before this sample.

Optionally, a parameter indicating whether sub-frame reordering needs to be done is also included in the SubFrameTimingGroupEntry. This parameter, set by the encapsulation module when it has the knowledge about sub-frame order in the G-PCC bit-stream, may be useful for readers or parsers. When an indication of reordering is set, parsers or readers know that they may need buffering to render captured frames (represented by sub-frames in encoded frames) in their acquisition order. Conversely, when the parameter indicates that no reordering is expected, parsers or readers do not need to allocate memory for reordering decoded frames or sub-frames. When the SubFrameTimingGroupEntry description contains a parameter indicating whether sub-frame reordering needs to be done, this parameter may also be considered to indicate whether a single time offset delta describes the timing for all sub-frames in a group of samples or not, for example in addition to a constant duration for the sub-frames. More generally for sub-frame timing information, one advantage of declaring it as a sample group is that static configurations can easily be handled by setting appropriate flags values (e.g. static_group_description or static_mapping) in the SampleGroupDescriptionBox with grouping_type corresponding to sub-frame timing information (e.g. 'sfcf' or any dedicated 4 CC, not conflicting with existing ones). Likewise, when all the samples of a track share the same sub-frame configuration and timing information, the default sample grouping mechanism may be used (e.g. a default description index indicates the entry providing the default sub-frame timing information for all samples not mapped to any sample group). The default sub-frame timing information may use one of the alternatives for representation of sub-frame timing information.

In another embodiment, the information provided in the AVDI is exposed at the file format level for any type of attributes. Depending on the scope of the structure containing the AVDI data, the file writer may provide the AVDI data in different file format structures. For instance, when the AVDI pertains to one or more slices of a single point cloud frame, the file writer may signal the AVDI in a sub-sample ("subs") box dedicated to slice sub-samples (for example indicated by a specific flags value). When, the AVDI scope is one or more point cloud frames, the file writer may signal the AVDI in a sample group that describe the corresponding point cloud frame. When the scope of the AVDI data is the whole sequence, the writer may signal the AVDI in an item of information provided in a sample entry so that it applies to all the samples of the media file referencing this sample entry.

For example, the AttributeConfigurationGroupEntry below is a volumetric sample group entry that provides description of the attribute values of the samples in the media file:

```
class AttributeConfigurationGroupEntry ( ) extends
VolumetricVisualSampleGroupEntry ('sfcf') {
    unsigned int (16) avdi_data_cnt;
    for (j=0; j< avdi_data_cnt; j++) {
        generic_attribute_value_properties( );
    }
}
``` with the same semantics as in the previous embodiments for AVDI at bit-stream level.

In another embodiment, the de-encapsulation module (e.g. de-encapsulation module 132 in FIG. 1) determines the presence of AVDI in the metadata part of the media file. When the metadata contain AVDI data, for example in a sample group, the de-encapsulation module may determine the range of attribute values, the list of attribute values, and/or timed information associated with the attribute value of the samples described by the sample group. As a result, the de-encapsulation module can determine the samples that contain specific values for a given attribute. For example, if it is assumed that the attribute describes a classification (e.g. value set to 0 for vehicles, to 1 for persons, and to 2 for buildings) of detected objects in the point cloud frames then, the de-encapsulation can determine the samples that contain persons by selecting the samples with the value 2 in the attribute value list of the AVDI data. In another example, when a sample group contains AVDI with timing information, the de-encapsulation module is able to determine precise time range captured in each sample by retrieving the attribute value ranges coded in the AVDI for the Timestamp attribute.

In some embodiments, the decompression module (e.g. decompression module 136 in FIG. 1) may parse the AVDI provided in the Data Unit of the coded point cloud to skip decoding of the data units (GDUs and ADUs) that have attribute value outside a given range. In particular, the decompression module is able to skip the GDUs and ADUs until reaching the point cloud frame that contains a given Frame Number value. In addition, the decompression module allocates a buffer of decoded samples according to information provided by the AVDI to ensure that the sub-frames can be reordered after decoding.

Particular Aspects of the Disclosure

According to an aspect of the disclosure there is provided a method of encoding point cloud data into a point cloud bit-stream, the method comprising:

obtaining point cloud data comprising at least one point cloud frame, the at least one point cloud frame comprising 3D points and data of one or more attributes associated with the 3D points, obtaining, for at least one of the one or more attributes, at least one item of information describing at least a part of different attribute values present in the point cloud data, encoding the obtained point cloud data into geometry and attribute data units in a point cloud bit-stream, and encoding the obtained at least one item of information in at least one further data unit of the point cloud bit-stream.

Accordingly, the method of the disclosure makes it possible to describe attribute data in a bit-stream comprising encoded 3D points and attribute data, making it possible, in particular, to identify or access specific encoded point cloud data to be encapsulated, and/or to describe encapsulated point cloud data, without decoding encoded point cloud data, saving resource of an encapsulation module.

According to some embodiments, the obtained at least one item of information is encoded in a parameter set or in a dedicated data unit.

Still according to some embodiments, the obtained at least one item of information comprises at least one of i) a list of possible values for the at least one of the one or more attributes, ii) a minimum value for the at least one of the one or more attributes, iii) a maximum value for the at least one of the one or more attributes, and iv) the number of different values of the at least one of the one or more attributes.

Still according to some embodiments, the at least one of the one or more attributes comprises a frame index (or a frame number) and the obtained at least one item of information comprises a range of values of frame index (or of frame number) attributes present in the at least one point cloud frame.

Still according to some embodiments, the obtained at least one item of information further comprises a flag indicating, when set to a first value, that each point cloud frame of the at least one point cloud frame comprises one sub-frame for each value of the range of values.

Still according to some embodiments, the method further comprises determining at least one sub-set of 3D points in point cloud frames, the at least one item of information describing attribute data associated with the at least one sub-set of 3D points.

According to another aspect of the disclosure there is provided a method for encapsulating a point cloud bit-stream in a media file, the method comprising:

obtaining a bit-stream comprising data units, the data units comprising geometry data units encoding 3D points, attribute data units encoding data of one or more attributes associated with the 3D points, and further data units encoding at least one first item of information describing at least one first part of different attribute values of at least one of the one or more attributes, the 3D points belonging to at least one point cloud frame, obtaining the at least one first item of information from the bit-stream, generating at least one second item of information describing at least one second part of different attribute values of the at least one of the one or more attributes, based on the at least one first item of information, independently of the attribute data units, and encapsulating, in a media file, at least some of the geometry data units, at least some of the attribute data units, and the generated at least one second item of information.

Accordingly, the method of the disclosure makes it possible to obtain a description of attribute data from a bit-stream containing encoded point cloud data, making it possible, in particular, to access and to extract specific encoded point cloud data and/or to describe point cloud data to be encapsulated, and to generate a media file comprising encapsulated point cloud data and a description of encapsulated attribute data, saving resource of an encapsulation module.

According to some embodiments, the at least one second item of information corresponds to the at least one first item of information or wherein the at least one second part corresponds to a portion of the at least one first part.

Still according to some embodiments, the method further comprises encoding the generated at least one second item of information in data units and encapsulating the data units comprising the generated at least one second item of information.

According to another aspect of the disclosure there is provided a method for encapsulating a point cloud bit-stream in a media file, the method comprising:

obtaining a bit-stream comprising data units, the data units comprising geometry data units encoding 3D points, attribute data units encoding data of one or more attributes associated with the 3D points, and further data units encoding at least one item of information describing at least a part of different attribute values of at least one of the one or more attributes, the 3D points belonging to at least one point cloud frame, obtaining the at least one item of information from the bit-stream, and encapsulating, in a media file, at least some of the geometry data units and at least some of the attribute data units, based on the obtained at least one item of information.

Accordingly, the method of the disclosure makes it possible to obtain a description of attribute data from a bit-stream containing encoded point cloud data, making it possible, in particular, to access and to extract specific encoded point cloud data and/or to describe point cloud data to be encapsulated, and to generate a media file comprising encapsulated point cloud data and a description of encapsulated attribute data, saving resource of an encapsulation module.

According to some embodiments, encapsulating, in a media file, at least some of the geometry data units and at least some of the attribute data units further comprises encapsulating further data units comprising at least one of the obtained at least one item of information.

Still according to some embodiments, the at least one item of information obtained from the bit-stream is encoded in a parameter set or in a dedicated data unit.

Still according to some embodiments, the at least one item of information obtained from the bit-stream comprises at least one of i) a list of possible values for the at least one of the one or more attributes, ii) a minimum value for the at least one of the one or more attributes, iii) a maximum value for the at least one of the one or more attributes, and iv) the number of different values for the at least one of the one or more attribute.

Still according to some embodiments, the at least one of the one or more attributes comprises a frame index (or a frame number) and the at least one item of information obtained from the bit-stream comprises a range of values of frame index (or of frame number) attributes present in the at least one point cloud frame.

Still according to some embodiments, the at least one item of information obtained from the bit-stream further comprises a flag indicating, when set to a first value, that each point cloud frame of the at least one point cloud frame comprises one sub-frame for each value of the range of values.

According to another aspect of the disclosure there is provided a method for generating a point cloud bit-stream from a media file, the method comprising:

obtaining a media file comprising encapsulated data units, the encapsulated data units comprising encapsulated geometry data units encoding 3D points and encapsulated attribute data units encoding data of one or more attributes associated with the 3D points, the media file further comprising at least one first item of information describing at least a first part of different attribute values of at least one of the one or more attributes, the 3D points belonging to at least one point cloud frame, obtaining the at least one first item of information;

parsing the obtained media file to obtain at least some of the geometry data units and at least some of the attribute data units, generating at least one second item of information describing at least one second part of different attribute values of the at least one of the one or more attributes, based on the at least one first item of information, and generating a point cloud bit-stream comprising the obtained geometry data units, the obtained attribute data units, and the generated at least one second item of information.

Accordingly, the method of the disclosure makes it possible to process a media file comprising information describing different attribute values of at least one attribute, making it possible, in particular, to access and to extract specific encoded point cloud data and/or to generate a bit-stream comprising point cloud data and a description of encoded attribute data, saving resource of a parser module.

According to some embodiments, the at least one second item of information corresponds to the at least one first item of information or wherein the at least one second part corresponds to a portion of the at least one first part.

Still according to some embodiments, the method further comprises encoding the generated at least one second item of information in data units, the generated point cloud bit-stream further comprising the data units comprising the generated at least one second item of information.

Still according to some embodiments, the obtained media file further comprises encapsulated further data units encoding the at least one first item of information.

According to another aspect of the disclosure there is provided a method for generating a point cloud bit-stream from a media file, the method comprising:

obtaining a media file comprising encapsulated data units, the encapsulated data units comprising encapsulated geometry data units encoding 3D points and encapsulated attribute data units encoding data of one or more attributes associated with the 3D points, the media file further comprising at least one item of information describing at least a part of different attribute values of at least one of the one or more attributes, the 3D points belonging to at least one point cloud frame, obtaining the at least one item of information from the media file, parsing the obtained media file to obtain at least some of the geometry data units and at least some of the attribute data units, and generating a point cloud bit-stream comprising the obtained geometry data units and the obtained attribute data units, based on the obtained at least one item of information.

Accordingly, the method of the disclosure makes it possible to process a media file comprising information describing different attribute values of at least one attribute, making it possible, in particular, to access and to extract specific encoded point cloud data and/or to generate a bit-stream comprising point cloud data and a description of encoded attribute data, saving resource of a parser module.

According to some embodiments, the obtained media file further comprises encapsulated further data units encoding the at least one item of information.

Still according to some embodiments, the generated point cloud bit-stream further comprises the obtained at least one item of information.

Still according to some embodiments, the method further comprises generating data units comprising the obtained at least one item of information, wherein the point cloud bit-stream generated during generating further comprises the generated data units comprising the obtained at least one item of information.

According to another aspect of the disclosure there is provided a method for generating point cloud data from a point cloud bit-stream, the method comprising:

obtaining a bit-stream comprising data units, the data units comprising geometry data units encoding 3D points, attribute data units encoding data of one or more attributes associated with the 3D points, and further data units encoding at least one item of information describing at least a part of different attribute values of at least one of the one or more attributes, the 3D points belonging to at least one point cloud frame, obtaining the geometry data units, the attribute data units, and the further data units, obtaining the at least one item of information, and generating point cloud data comprising some of the 3D points and associated attribute data, based on the obtained at least one item of information.

Accordingly, the method of the disclosure makes it possible to process a bit-stream comprising information describing different attribute values of at least one attribute, making it possible, in particular, to access and to extract specific encoded point cloud data, saving resource of a decoder.

According to some embodiments, the point cloud bit-stream is a G-PCC bit-stream and wherein the media file complies with an ISOBMFF based standard.

According to another aspect of the disclosure there is provided a device comprising a processing unit configured for carrying out each of the steps of the method described above.

This aspect of the disclosure has advantages similar to those mentioned above.

Hardware for Carrying Out Steps of Some Embodiments of the Disclosure

Figure 13:
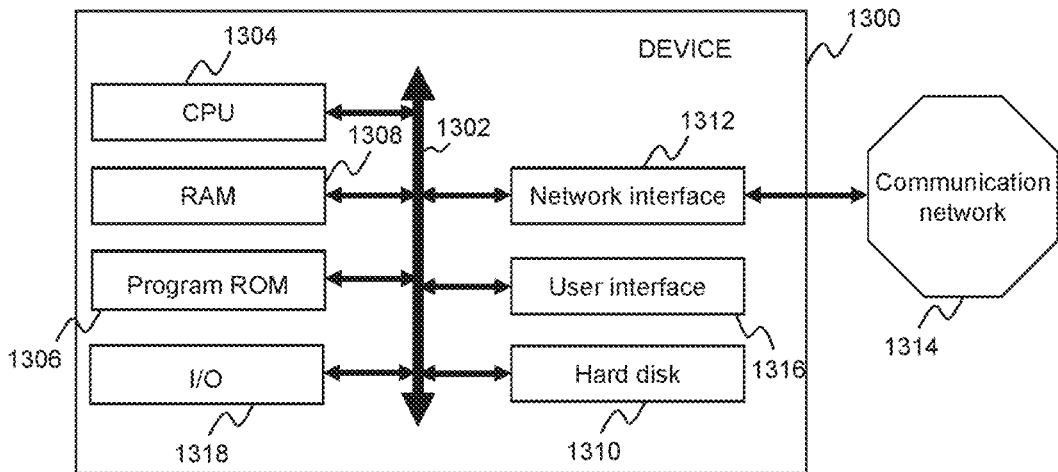
FIG. 13 schematically illustrates a processing device configured to implement at least one embodiment of the present disclosure.

FIG. 13 is a schematic block diagram of a computing device 1300 for implementation of one or more embodiments of the disclosure. The computing device 1300 may be a device such as a micro-computer, a workstation, or a light portable device. The computing device 1300 comprises a communication bus 1302 connected to:

a central processing unit (CPU) 1304, such as a micro-processor;

a random access memory (RAM) 1308 for storing the executable code of the method of embodiments of the disclosure as well as the registers adapted to record variables and parameters necessary for implementing the method for encapsulating, indexing, de-encapsulating, and/or accessing data, the memory capacity thereof can be expanded by an optional RAM connected to an expansion port for example;

a read only memory (ROM) 1306 for storing computer programs for implementing embodiments of the disclosure;

a network interface 1312 that is, in turn, typically connected to a communication network 1314 over which digital data to be processed are transmitted or received. The network interface 1312 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1304;

a user interface (UI) 1316 for receiving inputs from a user or to display information to a user;

a hard disk (HD) 1310; and/or an I/O module 1318 for receiving/sending data from/to external devices such as a video source or display.

The executable code may be stored either in read only memory 1306, on the hard disk 1310 or on a removable digital medium for example such as a disk. According to a variant, the executable code of the programs can be received by means of a communication network, via the network interface 1312, in order to be stored in one of the storage means of the communication device 1300, such as the hard disk 1310, before being executed.

The central processing unit 1304 is adapted to control and direct the execution of the instructions or portions of software code of the program or programs according to embodiments of the disclosure, which instructions are stored in one of the aforementioned storage means. After powering on, the CPU 1304 is capable of executing instructions from main RAM memory 1308 relating to a software application after those instructions have been loaded from the program ROM 1306 or the hard-disc (HD) 1310 for example. Such a software application, when executed by the CPU 1304, causes the steps of the flowcharts shown in the previous figures to be performed.

In this embodiment, the apparatus is a programmable apparatus which uses software to implement the method of the disclosure. However, alternatively, the method of the present disclosure may be implemented in hardware (for example, in the form of an Application Specific Integrated Circuit or ASIC).

Although the present disclosure has been described here-inabove with reference to specific embodiments, the present disclosure is not limited to the specific embodiments, and modifications will be apparent to a person skilled in the art which lie within the scope of the present disclosure.

Many further modifications and variations will suggest themselves to those versed in the art upon making reference to the foregoing illustrative embodiments, which are given by way of example only and which are not intended to limit the scope of the disclosure, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating point cloud data in a file compliant with an ISOBMFF based standard, the method comprising:

obtaining point cloud data comprising 3D points, the obtained point cloud data being organized in at least one point cloud frame;

determining at least two sub-frames of the at least one point cloud frame, a timing information being associated with each of the at least two sub-frames, the timing information associated with one of the at least two sub-frames being different from the timing information associated with the other of the at least two sub-frames;

generating metadata describing the at least two sub-frames, the generated metadata comprising or describing the timing information associated with each of the at least two sub-frames; and encapsulating the obtained 3D points and the generated metadata in the file, each point cloud frame being encapsulated as one or more samples.

2. The method of claim 1, wherein the timing information associated with at least one of the at least two sub-frames is determined as a function of capture time information associated with 3D points of the at least one of the at least two sub-frames or as a function of rendering timing information associated with 3D points of the at least one of the at least two sub-frames.

3. The method of claim 1, wherein the timing information associated with at least one of the at least two sub-frames is defined or described as a time interval between two consecutive sub-frames or as a time offset relative to a time-stamp.

4. The method of claim 1, wherein the timing information is relative to a sample.

5. The method of claim 1, wherein the timing information associated with at least one of the at least two sub-frames is provided within a sample group description.

6. The method of claim 1, wherein the at least two sub-frames are described in different tracks.

7. The method of claim 1, wherein the number of sub-frames per frame varies from one frame to another, and/or the number of 3D points within one of the at least two sub-frames is different from the number of 3D points within the other of the at least two sub-frames.

8. A method for parsing point cloud data encapsulated in a file compliant with an ISOBMFF based standard, the point cloud data comprising 3D points and being organized in at least one point cloud frame, each point cloud frame being encapsulated as one or more samples, the method comprising:

obtaining metadata from the file, identifying, from the obtained metadata, timing information associated with each of at least two sub-frames of the at least one point cloud frame, the timing information associated with one of the at least two sub-frames being different from the timing information associated with the other of the at least two sub-frames, and obtaining 3D points of at least one of the at least two sub-frames, the 3D points being obtained as a function of the timing information associated with the at least one of the at least two sub-frames.

9. The method of claim 8, wherein the timing information associated with at least one of the at least two sub-frames is representative of capture time information associated with 3D points of the at least one of the at least two sub-frames or representative of rendering timing information associated with 3D points of the at least one of the at least two sub-frames.

10. The method of claim 8, wherein the timing information associated with at least one of the at least two sub-frames is defined or described as a time interval between two consecutive sub-frames, or as a time offset relative to a timestamp.

11. The method of claim 8, wherein the at least two sub-frames are described in different tracks, and/or the number of sub-frames per frame varies from one frame to another, and/or the number of 3D points within one of the at least two sub-frames is different from the number of 3D points within the other of the at least two sub-frames.

12. The method of claim 8, wherein the timing information associated with each of the at least two sub-frames is provided within a sample group description.

13. A non-transitory computer-readable storage medium storing instructions for executing a method of encapsulating point cloud data in a file compliant with an ISOBMFF based standard, the method comprising:

obtaining point cloud data comprising 3D points, the obtained point cloud data being organized in at least one point cloud frame;

determining at least two sub-frames of the at least one point cloud frame, a timing information being associated with each of the at least two sub-frames, the timing information associated with one of the at least two sub-frames being different from the timing information associated with the other of the at least two sub-frames;

generating metadata describing the at least two sub-frames, the generated metadata comprising or describing the timing information associated with each of the at least two sub-frames; and encapsulating the obtained 3D points and the generated metadata in the file, each point cloud frame being encapsulated as one or more samples.

14. A device for encapsulating point cloud data in a file compliant with an ISOBMFF based standard comprising a processing unit configured to:

obtain point cloud data comprising 3D points, the obtained point cloud data being organized in at least one point cloud frame;

determine at least two sub-frames of the at least one point cloud frame, a timing information being associated with each of the at least two sub-frames, the timing information associated with one of the at least two sub-frames being different from the timing information associated with the other of the at least two sub-frames;

generate metadata describing the at least two sub-frames, the generated metadata comprising or describing the timing information associated with each of the at least two sub-frames; and encapsulate the obtained 3D points and the generated metadata in the file, each point cloud frame being encapsulated as one or more samples.

15. The method of claim 1, wherein the timing information indicates whether the sub-frames have constant duration or not.

16. The method of claim 8, wherein the timing information indicates whether the sub-frames have constant duration or not.

17. A non-transitory computer-readable storage medium storing instructions for executing a method for parsing point cloud data encapsulated in a file compliant with an ISOBMFF based standard, the point cloud data comprising 3D points and being organized in at least one point cloud frame, each point cloud frame being encapsulated as one or more samples, the method comprising:

obtaining metadata from the file, identifying, from the obtained metadata, timing information associated with each of at least two sub-frames of the at least one point cloud frame, the timing information associated with one of the at least two sub-frames being different from the timing information associated with the other of the at least two sub-frames, and obtaining 3D points of at least one of the at least two sub-frames, the 3D points being obtained as a function of the timing information associated with the at least one of the at least two sub-frames.

18. A device for parsing point cloud data encapsulated in a file compliant with an ISOBMFF based standard, the point cloud data comprising 3D points and being organized in at least one point cloud frame, each point cloud frame being encapsulated as one or more samples, the device comprising a processing unit configured to:

obtain metadata from the file;

identify, from the obtained metadata, timing information associated with each of at least two sub-frames of the at least one point cloud frame, the timing information associated with one of the at least two sub-frames being different from the timing information associated with the other of the at least two sub-frames; and obtain 3D points of at least one of the at least two sub-frames, the 3D points being obtained as a function of the timing information associated with the at least one of the at least two sub-frames.

* * * * *